US012807021B2

(12) United States Patent
Taguchi et al.

(10) Patent No.: US 12,807,021 B2
(45) Date of Patent: Nov. 24, 2026

(54) INFORMATION PROCESSING METHOD, INFORMATION PROCESSING DEVICE AND NON-TRANSITORY COMPUTER READABLE RECORDING MEDIUM STORING INFORMATION PROCESSING PROGRAM, INCLUDING DETERMINING A SECTION IN WHICH A VALUE OBTAINED BY SUBTRACTING THE CURRENT CHARGE RATE FROM A TARGET CHARGE RATE IS LARGER THAN A THRESHOLD AMONG A PLURALITY OF SECTIONS AS AN INSUFFICIENT CHARGE SECTION

(71) Applicant: Panasonic Intellectual Property Corporation of America, Torrance, CA (US)

(72) Inventors: Masahiro Taguchi, Osaka (JP); Nobuaki Tasaki, Osaka (JP); Tatsumi Nagashima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 128 days.

(21) Appl. No.: 18/944,664

(22) Filed: Nov. 12, 2024

(65) Prior Publication Data

US 2025/0065741 A1 Feb. 27, 2025

Related U.S. Application Data

(63) Continuation of application No. PCT/JP2023/015222, filed on Apr. 14, 2023.

(30) Foreign Application Priority Data

May 13, 2022 (JP) ................................ 2022-079701

(51) Int. Cl.

*B60L 53/35* (2019.01)
*B60L 53/62* (2019.01)
*B60L 53/67* (2019.01)

(52) U.S. Cl.

CPC ............... *B60L 53/35* (2019.02); *B60L 53/62* (2019.02); *B60L 53/67* (2019.02)

(58) Field of Classification Search

CPC .......... B60L 53/35; B60L 53/62; B60L 53/67; B60L 2260/52; B60L 2260/54;

(Continued)

(56) References Cited

U.S. PATENT DOCUMENTS

2016/0335377 A1 11/2016 Yamashina et al.
2020/0262305 A1* 8/2020 Chakraborty et al. .. B60L 53/57
2020/0317074 A1* 10/2020 Miller et al. ........... G06Q 50/40

FOREIGN PATENT DOCUMENTS

JP 2012-220289 * 11/2012 ............. G01C 21/00
JP 2013-90344 5/2013

(Continued)

OTHER PUBLICATIONS

International Search Report issued Jun. 27, 2023 in corresponding International Application No. PCT/JP2023/015222.

*Primary Examiner* — Brodie J Follman
(74) *Attorney, Agent, or Firm* — Wenderoth, Lind & Ponack, L.L.P.

(57) ABSTRACT

A server acquires a current position of each of a plurality of battery transport mobile bodies transporting a first battery, acquires a current position of each of a plurality of electric mobile bodies and a charge rate of a second battery included in each of the plurality of electric mobile bodies, calculates a current charge rate for each of a plurality of sections on a map based on a charge rate of at least one second battery present in each of the plurality of sections, determines an insufficient charge section having a current charge rate lower (Continued)

than a target charge rate among the plurality of sections, and outputs control information for moving at least one battery transport mobile body among the plurality of battery transport mobile bodies to the determined insufficient charge section.

14 Claims, 12 Drawing Sheets

(58) Field of Classification Search
CPC .......... B60L 58/12; G06Q 50/10; G08G 1/00; G16Y 10/40; G16Y 20/20; G16Y 40/60
See application file for complete search history.

(56) References Cited

FOREIGN PATENT DOCUMENTS

| | | |
|---|---|---|
| JP | 2015-163027 | 9/2015 |
| WO | 2017/022010 | 2/2017 |

* cited by examiner

INFORMATION PROCESSING METHOD, INFORMATION PROCESSING DEVICE AND NON-TRANSITORY COMPUTER READABLE RECORDING MEDIUM STORING INFORMATION PROCESSING PROGRAM, INCLUDING DETERMINING A SECTION IN WHICH A VALUE OBTAINED BY SUBTRACTING THE CURRENT CHARGE RATE FROM A TARGET CHARGE RATE IS LARGER THAN A THRESHOLD AMONG A PLURALITY OF SECTIONS AS AN INSUFFICIENT CHARGE SECTION

FIELD OF INVENTION

The present disclosure relates to a technique for supplying electric power from a battery transport mobile body that transports a battery to an electric mobile body to charge a battery of the electric mobile body.

BACKGROUND ART

For example, Patent Literature 1 discloses that a server estimates a scheduled travel route of each of a plurality of electric vehicles based on probe data including position information and remaining charge amount information of an electric vehicle, estimates a position of each of a plurality of electric vehicles at an optional time point based on the estimated scheduled travel route information, estimates distribution of charging needs in an optional area based on the estimated position information, predicts charge waiting time in a specific charging spot designated by the user of an electric vehicle that makes an information presentation request based on the estimated distribution of charging needs, and presents the predicted charge waiting time information on a display included in an electric vehicle.

However, in the above-described conventional technique, it has been difficult to efficiently and stably supply electric power to an electric mobile body, and further improvement has been required.

Patent Literature 1: WO 2017/022010 A

SUMMARY OF THE INVENTION

The present disclosure has been made to solve the above problem, and an object of the present disclosure is to provide a technique capable of efficiently and stably supplying electric power to an electric mobile body.

An information processing method according to the present disclosure is an information processing method by a computer, the information processing method including acquiring a current position of each of a plurality of battery transport mobile bodies transporting a first battery, acquiring a current position of each of a plurality of electric mobile bodies and a charge rate of a second battery included in each of the plurality of electric mobile bodies, calculating a current charge rate for each of a plurality of sections on a map based on a charge rate of at least one second battery present in each of the plurality of sections, determining an insufficient charge section having the current charge rate lower than a target charge rate among the plurality of sections, and outputting control information for moving at least one battery transport mobile body among the plurality of battery transport mobile bodies to the determined insufficient charge section.

According to the present disclosure, it is possible to efficiently and stably supply electric power to an electric mobile body.

DETAILED DESCRIPTION (Knowledge Underlying Present Disclosure)

Figure 1:
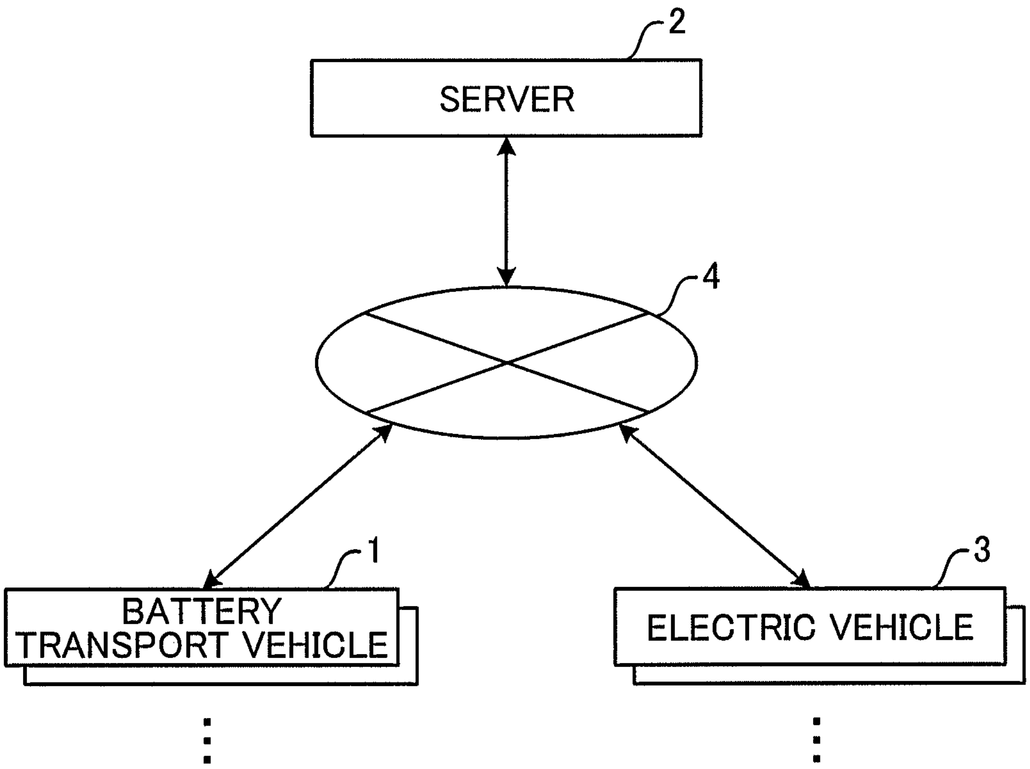
FIG. 1 is a diagram illustrating an overall configuration of a battery transport system according to a first embodiment of the present disclosure.

In the conventional technique described above, charge waiting time at a specific charging spot designated by the user of an electric vehicle who makes an information presentation request is predicted based on distribution of estimated charge needs, and predicted charge waiting time information is presented on a display included in the electric vehicle. Therefore, the user can know charge waiting time at a specific charging spot designated by the user of an electric vehicle, but in a case where a charging spot in the vicinity of the user is crowded, the user needs to go to a charging spot away from a current position of the user. For this reason, in the conventional technique, it has been difficult to efficiently and stably supply electric power to an electric vehicle.

In order to solve the above problem, a technique below is disclosed.

(1) An information processing method according to an aspect of the present disclosure is an information processing method by a computer, the information processing method including acquiring a current position of each of a plurality of battery transport mobile bodies transporting a first battery, acquiring a current position of each of a plurality of electric mobile bodies and a charge rate of a second battery included in each of the plurality of electric mobile bodies, calculating a current charge rate for each of a plurality of sections on a map based on a charge rate of at least one second battery present in each of the plurality of sections, determining an insufficient charge section having the current charge rate lower than a target charge rate among the plurality of sections, and outputting control information for moving at least one battery transport mobile body among the plurality of battery transport mobile bodies to the determined insufficient charge section.

According to this configuration, a current charge rate is calculated for each of a plurality of sections on a map based on a charge rate of at least one second battery present in each of a plurality of sections, an insufficient charge section in which the calculated current charge rate is lower than a target charge rate is determined among a plurality of sections, and at least one battery transport mobile body is arranged in the determined insufficient charge section. Therefore, electric power can be efficiently and stably supplied to an electric mobile body.

(2) In the information processing method described in (1) above, the current charge rate may include a current average charge rate indicating an average of current charge rates of the second batteries of the at least one electric mobile body present in each of the plurality of sections, and the information processing method may further include acquiring a history of the current average charge rates calculated in past in each of the plurality of sections, and calculating, for each of the plurality of sections, a statistical average charge rate indicating an average of the charge rates per unit time in each of the plurality of sections based on the acquired history of the current average charge rates, and determining the insufficient charge may include using the calculated statistical average charge rate as the target charge rate in determination of the insufficient charge section.

According to this configuration, a current average charge rate is compared with a statistical average charge rate indicating an average of charge rates per unit time in the past, and an insufficient charge section in which a current average charge rate is lower than a statistical average charge rate is determined, so that a section in which electric power for charging is insufficient can be estimated from a past history.

(3) The information processing method described in (1) or (2), determining the insufficient charge may include determining a section in which a value obtained by subtracting the current charge rate from the target charge rate is larger than a threshold among the plurality of sections as the insufficient charge section.

According to this configuration, among a plurality of sections, a section in which a value obtained by subtracting a current charge rate from a target charge rate is larger than a threshold is determined as an insufficient charge section, so that a section in which electric power for charging is insufficient can be reliably determined.

(4) The information processing method described in any one of (1) to (3) above may further include acquiring remaining capacity of the first battery of each of the plurality of battery transport mobile bodies, and extracting, from among the plurality of battery transport mobile bodies, a battery transport mobile body where a power amount necessary for the current charge rate to reach the target charge rate is equal to or less than the remaining capacity as the at least one battery transport mobile body heading to the insufficient charge section.

According to this configuration, it is possible to extract at least one battery transport mobile body capable of sufficiently supplying electric power to a plurality of electric mobile bodies present in an insufficient charge section.

(5) The information processing method described in any one of (1) to (3) may further include acquiring remaining capacity of the first battery of each of the plurality of battery transport mobile bodies, and extracting, from among the plurality of battery transport mobile bodies, a battery transport mobile body where a total power amount of a power amount necessary for the battery transport mobile body to move from a current position to the insufficient charge section, a power amount necessary for the battery transport mobile body to move from the insufficient charge section to a charging place for charging the first battery, and a power amount necessary for the current charge rate to reach the target charge rate is equal to or less than the remaining capacity as the at least one battery transport mobile body heading to the insufficient charge section.

According to this configuration, it is possible to extract at least one battery transport mobile body capable of sufficiently supplying electric power to a plurality of electric mobile bodies present in an insufficient charge section, moving from a current position to the insufficient charge section, and moving from the insufficient charge section to a charging place for charging the first battery.

(6) The information processing method described in (4) or (5) above may further include, in a case where a plurality of battery transport mobile bodies heading to the insufficient charge section are extracted, determining, as the at least one battery transport mobile body heading to the insufficient charge section, a battery transport mobile body where a total power amount of a power amount necessary for the battery transport mobile body to move from a current position to the insufficient charge section and a power amount necessary for the battery transport mobile body to move from the insufficient charge section to a charging place for charging the first battery is equal to or less than a predetermined power amount.

According to this configuration, in a case where a plurality of battery transport mobile bodies heading to an insufficient charge section are extracted, a battery transport mobile body in which a power amount necessary for movement is equal to or less than a predetermined power amount is determined as at least one battery transport mobile body heading to the insufficient charge section, so that a power amount necessary for movement can be reduced, and moving time can be shortened.

(7) The information processing method described in (4) or (5) above may further include, in a case where a plurality of battery transport mobile bodies heading to the insufficient charge section are extracted, determining, as the at least one battery transport mobile body heading to the insufficient charge section, a battery transport mobile body having a minimum power amount obtained by subtracting, from the remaining capacity of the battery transport mobile body, a total power amount of a power amount necessary for the battery transport mobile body to move from a current position to the insufficient charge section, a power amount necessary for the battery transport mobile body to move from the insufficient charge section to a charging place for charging the first battery, and a power amount necessary for the current charge rate to reach the target charge rate.

According to this configuration, in a case where a plurality of battery transport mobile bodies heading to an insufficient charge section are extracted, a battery transport mobile body capable of eliminating power shortage in the insufficient charge section with a minimum power amount can be determined as at least one battery transport mobile body heading to the insufficient charge section.

(8) The information processing method described in (4) or (5) above may further include decreasing the target charge rate in a case where the at least one battery transport mobile body heading to the insufficient charge section is not extracted, and extracting the battery transport mobile body may include extracting again the at least one battery transport mobile body heading to the insufficient charge section from the plurality of battery transport mobile bodies by using the decreased target charge rate.

According to this configuration, in a case where at least one battery transport mobile body heading to an insufficient charge section is not extracted, a target charge rate is lowered, so that a power amount necessary for a current charge rate to reach a target charge rate is decreased. By the above, it is possible to alleviate an extraction condition of at least one battery transport mobile body heading to an insufficient charge section, and the possibility that at least one battery transport mobile body heading to the insufficient charge section is extracted is increased.

(9) The information processing method described in (4) or (5) above may further include, in a case where the at least one battery transport mobile body heading to the insufficient charge section is not extracted, extracting, from the plurality of battery transport mobile bodies as the at least one battery transport mobile body heading to the insufficient charge section, a combination of two or more battery transport mobile bodies where the sum of the remaining capacities of the two or more battery transport mobile bodies among the plurality of battery transport mobile bodies is equal to or more than a power amount necessary for the current charge rate to reach the target charge rate.

According to this configuration, even if there is no one battery transport mobile body whose remaining capacity is equal to or more than a power amount necessary for a current charge rate to reach a target charge rate, in a case where there are two or more battery transport mobile bodies where the sum of remaining capacities of the two or more battery transport mobile bodies is equal to or more than a power amount necessary for the current charge rate to reach the target charge rate, a combination of the two or more battery transport mobile bodies can be extracted from a plurality of battery transport mobile bodies as at least one battery transport mobile body heading to an insufficient charge section.

(10) The information processing method described in any one of (1) to (9) above may further include, in a case where the current charge rate reaches the target charge rate in the insufficient charge section, outputting control information for moving the battery transport mobile body from the insufficient charge section to a charging place for charging the first battery.

According to this configuration, in a case where power shortage in an insufficient charge section is resolved, a battery transport mobile body can be moved from the insufficient charge section.

(11) The information processing method described in any one of (1) to (9) above may further include acquiring remaining capacity of the first battery of each of the plurality of battery transport mobile bodies, in a case where the current charge rate reaches the target charge rate in the insufficient charge section, determining again an insufficient charge section in which the current charge rate is lower than the target charge rate among the plurality of sections, and in a case where the insufficient charge section determined again is present within a predetermined distance from a current position of the battery transport mobile body present in the insufficient charge section, and a power amount necessary for the current charge rate in the insufficient charge section determined again to reach the target charge rate is equal to or less than remaining capacity of the battery transport mobile body, outputting control information for causing the battery transport mobile body present in the insufficient charge section to stand by.

According to this configuration, a battery transport mobile body in an insufficient charge section in which power shortage is resolved can be caused to stand by, and can be moved to another insufficient charge section present within a predetermined distance from a position where the battery transport mobile body is caused to stand by. Therefore, a power amount necessary for movement can be reduced, and moving time can be shortened.

(12) The information processing method described in any one of (1) to (11) above may further include outputting a presentation image including a map, a first icon indicating a current position on the map of the electric mobile body, and a second icon indicating a current position on the map of the battery transport mobile body present in the insufficient charge section.

According to this configuration, a presentation image including a map, the first icon indicating a current position on the map of an electric mobile body, and the second icon indicating a current position on the map of a battery transport mobile body present in an insufficient charge section is output. Therefore, a driver of an electric mobile body can identify a position on a map of a battery transport mobile body by checking a presentation image, and can move the electric mobile body toward the battery transport mobile body.

(13) The information processing method described in any one of (1) to (11) above may further include outputting a presentation image including a map, a first icon indicating a position on the map of a charging base for charging the first battery of the battery transport mobile body, and a second icon indicating a current position on the map of the battery transport mobile body present in the insufficient charge section.

According to this configuration, a presentation image including a map, the first icon indicating a position on the map of a charging base for charging the first battery of a battery transport mobile body, and the second icon indicating a current position on the map of a battery transport mobile body present in an insufficient charge section is output. Therefore, an administrator of a battery transport mobile body can identify positions on a map of a charging base and a battery transport mobile body by checking a presentation image, and can check whether there is no abnormality in a battery transport mobile body.

The present disclosure can be implemented not only as the information processing method for performing the characteristic processing as described above, but also as an information processing device or the like having a characteristic configuration corresponding to the characteristic processing performed by the information processing method. The present disclosure can also be implemented as a computer program that causes a computer to execute characteristic processing included in the information processing method described above. Thus, an effect similar to that in the above information processing method can also be achieved by another aspect described below.

(14) An information processing device according to another aspect of the present disclosure includes a first acquisition part that acquires a current position of each of a plurality of battery transport mobile bodies transporting a first battery, a second acquisition part that acquires a current position of each of a plurality of electric mobile bodies and a charge rate of a second battery included in each of the plurality of electric mobile bodies, a calculation part that calculates a current charge rate for each of a plurality of sections on a map based on a charge rate of at least one second battery present in each of the plurality of sections, a determination part that determines an insufficient charge section having the current charge rate lower than a target charge rate among the plurality of sections, and an output part that outputs control information for moving at least one battery transport mobile body among the plurality of battery transport mobile bodies to the determined insufficient charge section.

(15) An information processing program according to another aspect of the present disclosure causes a computer to acquire a current position of each of a plurality of battery transport mobile bodies transporting a first battery, acquire a current position of each of a plurality of electric mobile bodies and a charge rate of a second battery included in each of the plurality of electric mobile bodies, calculate a current charge rate for each of a plurality of sections on a map based on a charge rate of at least one second battery present in each of the plurality of sections, determine an insufficient charge section having the current charge rate lower than a target charge rate among the plurality of sections, and output control information for moving at least one battery transport mobile body among the plurality of battery transport mobile bodies to the determined insufficient charge section.

(16) A non-transitory computer-readable recording medium according to another aspect of the present disclosure records an information processing program, and the information processing program causes a computer to function to acquire a current position of each of a plurality of battery transport mobile bodies transporting a first battery, acquire a current position of each of a plurality of electric mobile bodies and a charge rate of a second battery included in each of the plurality of electric mobile bodies, calculate a current charge rate for each of a plurality of sections on a map based on a charge rate of at least one second battery present in each of the plurality of sections, determine an insufficient charge section having the current charge rate lower than a target charge rate among the plurality of sections, and output control information for moving at least one battery transport mobile body among the plurality of battery transport mobile bodies to the determined insufficient charge section.

Hereinafter, an embodiment of the present disclosure will be described with reference to the accompanying drawings. Note that the embodiment below is an example of embodiment of the present disclosure, and does not limit the technical scope of the present disclosure.

First Embodiment

FIG. 1 is a diagram illustrating an overall configuration of a battery transport system according to a first embodiment of the present disclosure.

The battery transport system illustrated in FIG. 1 includes a plurality of battery transport vehicles 1, a server 2, and a plurality of electric vehicles 3.

The battery transport vehicle 1 is an example of a battery transport mobile body. The battery transport vehicle 1 is, for example, an electric automobile, an electric truck, or an electric drone. A first battery is mounted on the battery transport vehicle 1. The first battery is a chargeable and dischargeable secondary battery. The battery transport vehicle 1 transports the first battery. The battery transport vehicle 1 transports the first battery and supplies electric power from the first battery to the electric vehicle 3. The battery transport vehicle 1 moves by using the mounted first battery. Note that the battery transport vehicle 1 may move by using a battery different from the first battery that supplies electric power to the electric vehicle 3. The battery transport vehicle 1 is an unmanned autonomous driving vehicle, and moves by autonomous driving.

In a charging base, the battery transport vehicle 1 charges the first battery and stands by. Then, the battery transport vehicle 1 moves from the charging base to a charging spot provided in each of a plurality of sections on a map according to an instruction of the server 2. The map is divided into grids, so that a plurality of sections are formed on the map. For example, a section is a square region having a side of five kilometers or a rectangular region having a long side of five kilometers and a short side of three kilometers. Further, a charging spot may be provided in all of a plurality of sections, or a charging spot does not need to be provided in a section with low traffic volume.

The battery transport vehicle 1 is communicably connected to the server 2 via a network 4. The network 4 is the Internet, for example. The battery transport vehicle 1 periodically transmits a current position of the battery transport vehicle 1, maximum charge capacity of the first battery, and remaining capacity of the first battery to the server 2. The battery transport vehicle 1 includes a global positioning system (GPS) receiver that acquires position information indicating a current position of the battery transport vehicle 1. The battery transport vehicle 1 periodically transmits the acquired position information to the server 2. Further, the battery transport vehicle 1 periodically transmits maximum charge capacity and remaining capacity of the first battery mounted on the battery transport vehicle 1 to the server 2.

The electric vehicle 3 is an example of an electric mobile body that moves by using a mounted second battery. The second battery is a chargeable and dischargeable secondary battery. The electric vehicle 3 is, for example, an electric automobile, an electric truck, an electric bus, or an electric motorcycle, and moves by supplying electric power charged in the second battery to an electric motor. In a charging spot, the electric vehicle 3 charges the second battery.

Note that, in a charging spot, the battery transport vehicle 1 and the electric vehicle 3 are connected by a cable, electric power is supplied from the first battery of the battery transport vehicle 1 to the second battery of the electric vehicle 3, and the second battery is charged. Further, the electric vehicle 3 may be equipped with the replaceable second battery. In this case, in a charging spot, the second battery of the electric vehicle 3 may be replaced with the first battery of the battery transport vehicle 1. A driver may replace the second battery mounted on the electric vehicle 3 with the first battery transported by the battery transport vehicle 1.

The electric vehicle 3 is communicably connected to the server 2 via the network 4. The electric vehicle 3 periodically transmits a current position of the electric vehicle 3, maximum charge capacity of the second battery, remaining capacity of the second battery, and a charge rate of the second battery to the server 2. The charge rate is a state of charge (SOC) and is represented by (remaining capacity [Ah]/maximum charge capacity [Ah])*100. The electric vehicle 3 calculates the charge rate based on maximum charging capacity and remaining capacity of the second battery. The electric vehicle 3 includes a GPS receiver that acquires position information indicating a current position of the electric vehicle 3. The electric vehicle 3 periodically transmits acquired position information to the server 2. Further, the electric vehicle 3 periodically transmits maximum charge capacity, remaining capacity, and a charge rate of the second battery mounted on the electric vehicle 3 to the server 2.

The server 2 is a Web server, for example. The server 2 is an example of an information processing device.

Figure 2:
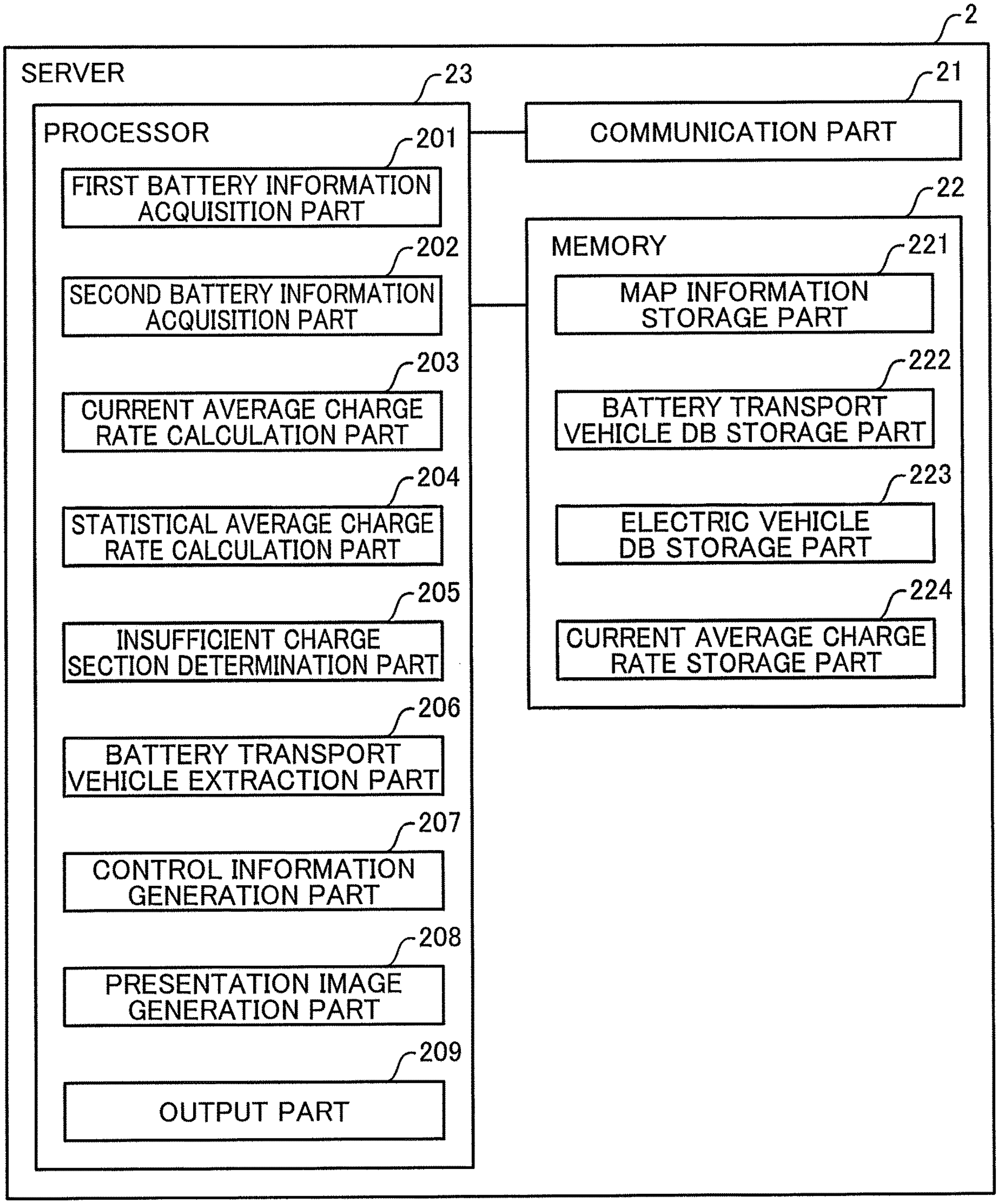
FIG. 2 is a diagram illustrating an example of a configuration of a server according to the first embodiment of the present disclosure.

FIG. 2 is a diagram illustrating an example of a configuration of the server 2 according to the first embodiment of the present disclosure.

The server 2 illustrated in FIG. 2 includes a communication part 21, a memory 22, and a processor 23.

The communication part 21 periodically receives a current position, maximum charge capacity, and remaining capacity transmitted by each of a plurality of the battery transport vehicles 1. The communication part 21 stores received current position, maximum charge capacity, and remaining capacity in a battery transport vehicle DB storage part 222 in association with a battery transport vehicle ID.

Further, the communication part 21 periodically receives a current position, maximum charging capacity, remaining capacity, and a charge rate transmitted by each of a plurality of the electric vehicles 3. The communication part 21 stores received current position, maximum charge capacity, remaining capacity, and charge rate in an electric vehicle DB storage part 223 in association with an electric vehicle ID.

Note that, in the first embodiment, the electric vehicle 3 calculates a charge rate based on maximum charging capacity and remaining capacity, and transmits the calculated charge rate to the server 2, but the present disclosure is not particularly limited to this. The electric vehicle 3 may transmit maximum charging capacity and remaining capacity to the server 2 without transmitting a charge rate to the server 2. In this case, the server 2 may calculate a charge rate of the electric vehicle 3 based on received maximum charging capacity and remaining capacity of the electric vehicle 3.

The memory 22 is a storage device that can store various types of information, such as a random access memory (RAM), a hard disk drive (HDD), a solid state drive (SSD), or a flash memory. The memory 22 realizes a map information storage part 221, the battery transport vehicle database (DB) storage part 222, the electric vehicle database (DB) storage part 223, and a current average charge rate storage part 224.

The processor 23 is, for example, a central processing unit (CPU). The processor 23 realizes a first battery information acquisition part 201, a second battery information acquisition part 202, a current average charge rate calculation part 203, a statistical average charge rate calculation part 204, an insufficient charge section determination part 205, a battery transport vehicle extraction part 206, a control information generation part 207, a presentation image generation part 208, and an output part 209.

Note that the first battery information acquisition part 201 to the output part 209 and the map information storage part 221 to the current average charge rate storage part 224 may be configured by a dedicated hardware circuit. Further, the first battery information acquisition part 201 to the output part 209 and the map information storage part 221 to the current average charge rate storage part 224 may be dispersedly arranged in a plurality of devices.

The map information storage part 221 stores in advance map information indicating a map divided into a plurality of sections.

The battery transport vehicle DB storage part 222 stores a battery transport vehicle DB in which a battery transport vehicle ID for identifying the battery transport vehicle 1 is associated with a current position, maximum charge capacity, and remaining capacity of the battery transport vehicle 1. In the battery transport vehicle DB, latest data is stored every time a battery transport vehicle ID, a current position, maximum charge capacity, and remaining capacity of each of the battery transport vehicles 1 are received by the communication part 21.

The electric vehicle DB storage part 223 stores an electric vehicle DB in which an electric vehicle ID for identifying the electric vehicle 3 is associated with a current position, maximum charging capacity, remaining capacity, and a charge rate of the electric vehicle 3. In the electric vehicle DB, latest data is stored every time an electric vehicle ID, a current position, maximum charging capacity, remaining capacity, and a charge rate of each of the electric vehicles 3 are received by the communication part 21.

Note that the electric vehicle DB storage part 223 may store an electric vehicle DB in which an electric vehicle ID is associated with a current position, maximum charging capacity, and a charge rate of the electric vehicle 3. Further, the electric vehicle DB storage part 223 may store an electric vehicle DB in which an electric vehicle ID is associated with a current position, maximum charging capacity, and remaining capacity of the electric vehicle 3.

The first battery information acquisition part 201 acquires a current position of each of a plurality of the battery transport vehicles 1 and remaining capacity of the first battery from the battery transport vehicle DB storage part 222.

The second battery information acquisition part 202 acquires a current position of each of a plurality of the electric vehicles 3 and a charge rate of the second battery included in each of a plurality of the electric vehicles 3 from the electric vehicle DB storage part 223.

The current average charge rate calculation part 203 calculates a current charge rate for each of a plurality of sections based on a charge rate of at least one second battery present in each of a plurality of sections on a map. The current charge rate includes a current average charge rate indicating an average of current charge rates of the second batteries of at least one of the electric vehicles 3 present in each of a plurality of sections.

The current average charge rate calculation part 203 calculates, for each of a plurality of sections, a current average charge rate indicating an average of current charge rates of the second batteries included in a plurality of the electric vehicles 3 present in each of a plurality of sections on the map. Note that the current average charge rate calculation part 203 can identify a plurality of the electric vehicles 3 present in each section from current positions of a plurality of the electric vehicles 3.

The current average charge rate calculation part 203 stores a calculated current average charge rate for each of a plurality of sections in the current average charge rate storage part 224.

The current average charge rate storage part 224 stores a history of current average charge rates for each of a plurality of sections calculated by the current average charge rate calculation part 203. The current average charge rate storage part 224 stores a section ID for identifying a section, a time when a current average charge rate is calculated, and a calculated current average charge rate in association with each other.

The statistical average charge rate calculation part 204 acquires a history of current average charge rates calculated in the past in each of a plurality of sections from the current average charge rate storage part 224. The statistical average charge rate calculation part 204 calculates, for each of a plurality of sections, a statistical average charge rate indicating an average of charge rates per unit time in each of a plurality of sections based on the acquired history of current average charge rates.

The insufficient charge section determination part 205 determines an insufficient charge section in which a current average charge rate is lower than a target charge rate among a plurality of sections. The insufficient charge section determination part 205 uses a statistical average charge rate calculated by the statistical average charge rate calculation part 204 as the target charge rate. That is, the insufficient charge section determination part 205 determines an insufficient charge section in which a current average charge rate is lower than a statistical average charge rate among a plurality of sections.

Note that, in the first embodiment, a statistical average charge rate is used as a target charge rate, but the present disclosure is not particularly limited to this, and a target charge rate for each section stored in advance in the memory 22 may be used.

Further, the insufficient charge section determination part 205 may determine a section in which a value obtained by subtracting a current average charge rate from a target charge rate is larger than a threshold among a plurality of sections as an insufficient charge section.

The battery transport vehicle extraction part 206 extracts, from among a plurality of battery transport vehicles, a battery transport vehicle where a power amount necessary for a current average charge rate to reach a target charge rate is equal to or less than remaining capacity as at least one battery transport vehicle heading to an insufficient charge section.

Note that, in the first embodiment, the battery transport vehicle extraction part 206 may extract at least one battery transport vehicle heading to an insufficient charge section in consideration of a power amount necessary for movement of the battery transport vehicle 1. That is, the battery transport vehicle extraction part 206 may extract, from among a plurality of battery transport vehicles, a battery transport vehicle where a total power amount of a power amount necessary for a battery transport vehicle to move from a current position to an insufficient charge section, a power amount necessary for a battery transport vehicle to move from an insufficient charge section to a charging place for charging the first battery, and a power amount necessary for a current average charge rate to reach a target charge rate is equal to or less than remaining capacity as at least one battery transport vehicle heading to the insufficient charge section.

Further, a power amount necessary for the battery transport vehicle 1 to move from a current position to an insufficient charge section is calculated based on a moving distance of the battery transport vehicle 1 from the current position to the insufficient charge section. A moving route from a current position to an insufficient charge section is calculated using a route search algorithm of a conventional technique. In the route search algorithm, a moving route with a shortest moving distance or a moving route with shortest moving time is calculated. The battery transport vehicle extraction part 206 calculates a moving route from a current position to an insufficient charge section, and calculates a power consumption amount of the battery transport vehicle 1 according to the calculated moving distance of the moving route. Note that a power amount necessary for the battery transport vehicle 1 to move from an insufficient charge section to a charging place for charging the first battery is also calculated in the same manner as described above.

As described above, the battery transport vehicle extraction part 206 extracts a battery transport vehicle in which remaining capacity of the first battery satisfies an extraction condition from among a plurality of battery transport vehicles as at least one battery transport vehicle heading to an insufficient charge section. That is, the battery transport vehicle extraction part 206 extracts a battery transport vehicle that satisfies an extraction condition that remaining capacity of the first battery is equal to or more than a power amount necessary for a current average charge rate to reach a target charge rate. Alternatively, the battery transport vehicle extraction part 206 extracts a battery transport vehicle that satisfies an extraction condition that remaining capacity of the first battery is equal to or more than a total power amount of a power amount necessary for a battery transport vehicle to move from a current position to an insufficient charge section, a power amount necessary for the battery transport vehicle to move from the insufficient charge section to a charging place for charging the first battery, and a power amount necessary for a current average charge rate to reach a target charge rate.

Note that there is a possibility that a plurality of battery transport vehicles satisfying an extraction condition are extracted. In view of the above, in a case where a plurality of battery transport vehicles heading to an insufficient charge section are extracted, the battery transport vehicle extraction part 206 determines, as at least one battery transport vehicle heading to the insufficient charge section, a battery transport vehicle in which a total power amount of a power amount necessary for the battery transport vehicle to move from a current position to the insufficient charge section and a power amount necessary for the battery transport vehicle to move from the insufficient charge section to a charging place for charging the first battery is equal to or less than a predetermined power amount.

Further, in a case where a plurality of battery transport vehicles heading to an insufficient charge section are extracted, the battery transport vehicle extraction part 206 may determine, as at least one battery transport vehicle heading to the insufficient charge section, a battery transport vehicle in which a total power amount of a power amount necessary for the battery transport vehicle to move from a current position to the insufficient charge section and a power amount necessary for the battery transport vehicle to move from the insufficient charge section to a charging place for charging the first battery is smallest.

Furthermore, in a case where a plurality of battery transport vehicles heading to an insufficient charge section are extracted, the battery transport vehicle extraction part 206 may determine, as at least one battery transport vehicle heading to the insufficient charge section, a battery transport vehicle having a minimum power amount obtained by subtracting, from remaining capacity of the battery transport vehicle, a total power amount of a power amount necessary for the battery transport vehicle to move from a current position to the insufficient charge section, a power amount necessary for the battery transport vehicle to move from the insufficient charge section to a charging place for charging the first battery, and a power amount necessary for a current average charge rate to reach a target charge rate.

Further, there is a possibility that a battery transport vehicle satisfying an extraction condition is not extracted. In view of the above, in a case where at least one battery transport vehicle heading to an insufficient charge section is not extracted, the battery transport vehicle extraction part 206 decreases a target charge rate. Then, the battery transport vehicle extraction part 206 extracts at least one battery transport vehicle heading to an insufficient charge section from a plurality of battery transport vehicles again by using the decreased target charge rate.

Note that the battery transport vehicle extraction part 206 may decrease a target charge rate gradually. For example, in a case where at least one battery transport vehicle heading to an insufficient charge section is not extracted first, the battery transport vehicle extraction part 206 may decrease a target charge rate by 10%. Then, in a case where at least one battery transport vehicle heading to an insufficient charge section is not extracted again, the battery transport vehicle extraction part 206 may further decrease the target charge rate by 10% (20% from the initial target charge rate). Then, in a case where at least one battery transport vehicle heading to an insufficient charge section is not extracted even in a case where the target charge rate is further decreased by 10%, the battery transport vehicle extraction part 206 does not need to extract at least one battery transport vehicle heading to the insufficient charge section.

The control information generation part 207 generates control information for moving at least one battery transport vehicle among a plurality of the battery transport vehicles 1 to an insufficient charge section determined by the insufficient charge section determination part 205.

The presentation image generation part 208 generates a driver presentation image (presentation image) including a map, an electric vehicle icon (first icon) indicating a current position on the map of the electric vehicle 3, and a battery transport vehicle icon (second icon) indicating a current position on the map of the battery transport vehicle 1 present in an insufficient charge section. The driver presentation image is generated for presentation to a driver of the electric vehicle 3.

The output part 209 outputs control information for moving at least one of the battery transport vehicles 1 among a plurality of the battery transport vehicles 1 to an insufficient charge section determined by the insufficient charge section determination part 205. The output part 209 outputs control information generated by the control information generation part 207 to the communication part 21. The communication part 21 transmits control information output by the output part 209 to at least one of the battery transport vehicles 1. At least one of the battery transport vehicles 1 receives control information transmitted by the server 2. Then, at least one of the battery transport vehicles 1 moves according to the received control information.

Further, the output part 209 outputs a driver presentation image (presentation image) generated by the presentation image generation part 208 to the communication part 21. The communication part 21 transmits driver presentation image output by the output part 209 to an information terminal. The information terminal may be a car navigation device mounted on the electric vehicle 3, or may be a smartphone or a tablet computer owned by a driver. The information terminal receives input from a driver and requests the server 2 for a driver presentation image. The server 2 generates a driver presentation image according to the request, and transmits the generated driver presentation image to the information terminal. The information terminal receives the driver presentation image transmitted by the server 2 and displays the received driver presentation image.

Note that the battery transport vehicle extraction part 206 preferably extracts a battery transport vehicle heading to an insufficient charge section from among a plurality of battery transport vehicles in a standby state. Further, the battery transport vehicle extraction part 206 may extract a battery transport vehicle heading to an insufficient charge section from among a plurality of battery transport vehicles in a charging state and a plurality of battery transport vehicles in a standby state.

Here, processing of extracting at least one battery transport vehicle heading to an insufficient charge section will be described.

Figure 3:
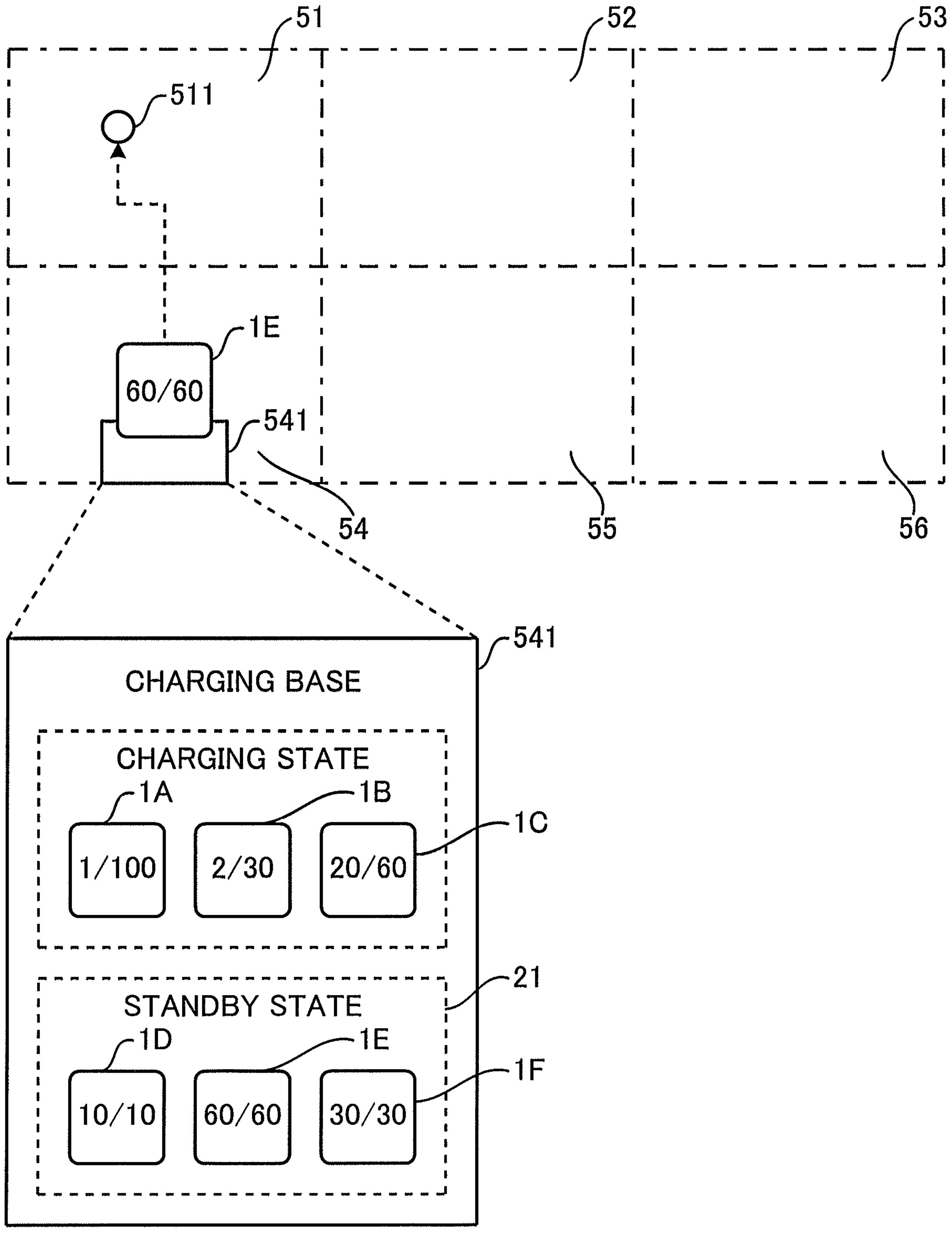
FIG. 3 is a schematic diagram for describing processing of extracting at least one battery transport vehicle heading to an insufficient charge section.

FIG. 3 is a schematic diagram for describing processing of extracting at least one battery transport vehicle heading to an insufficient charge section.

As illustrated in FIG. 3, a map is divided into a plurality of sections 51 to 56. In the section 54, there is a charging base 541. In the charging base 541, there are battery transport vehicles 1A to 1C in a charging state and battery transport vehicles 1D to 1F in a standby state.

The battery transport vehicles 1A to 1C in a charging state are being charged. The battery transport vehicles 1D to 1F in a standby state have already been charged. Numerical values illustrated in the battery transport vehicles 1A to 1F represent remaining capacity/maximum charge capacity. For example, maximum charge capacity of the battery transport vehicle 1A is 100 Ah, and remaining capacity is 1 Ah.

For example, a target charge rate (statistical average charge rate) in the section 51 is 90%, and a current average charge rate is 70%. For this reason, in FIG. 3, among a plurality of the sections 51 to 56, the section 51 is determined as an insufficient charge section. If the sum of maximum charge capacities of all the electric vehicles 3 present in the section 51 is 250 Ah, the sum of remaining capacities of all the electric vehicles 3 present in the section 51 is 175 Ah (=250 Ah*70%). At this time, a power amount necessary for a current average charge rate to reach the target charge rate is 225 Ah (=250 Ah*90%)−175 Ah=50 Ah. In a case where a power amount necessary for a battery transport vehicle to move from the charging base 541 to a charging spot 511 in the section 51 is 5 Ah, and a power amount necessary for a battery transport vehicle to return from the charging spot 511 to the charging base 541 is 5 Ah, a total power amount of a power amount necessary for a battery transport vehicle to move from a current position (the charging base 541) to an insufficient charge section (the section 51), a power amount necessary for a battery transport vehicle to move from the insufficient charge section (the section 51) to a charging place (the charging base 541) for charging the first battery, and a power amount necessary for a current average charge rate to reach the target charge rate is 60 Ah. In this case, the battery transport vehicle 1E having a total power amount equal to or less than remaining capacity is extracted from among a plurality of battery transport vehicles as at least one battery transport vehicle heading to the insufficient charge section. The extracted battery transport vehicle 1E moves toward the charging spot 511 in the section 51.

Next, battery transport processing of the server 2 in the first embodiment of the present disclosure will be described.

Figure 4:
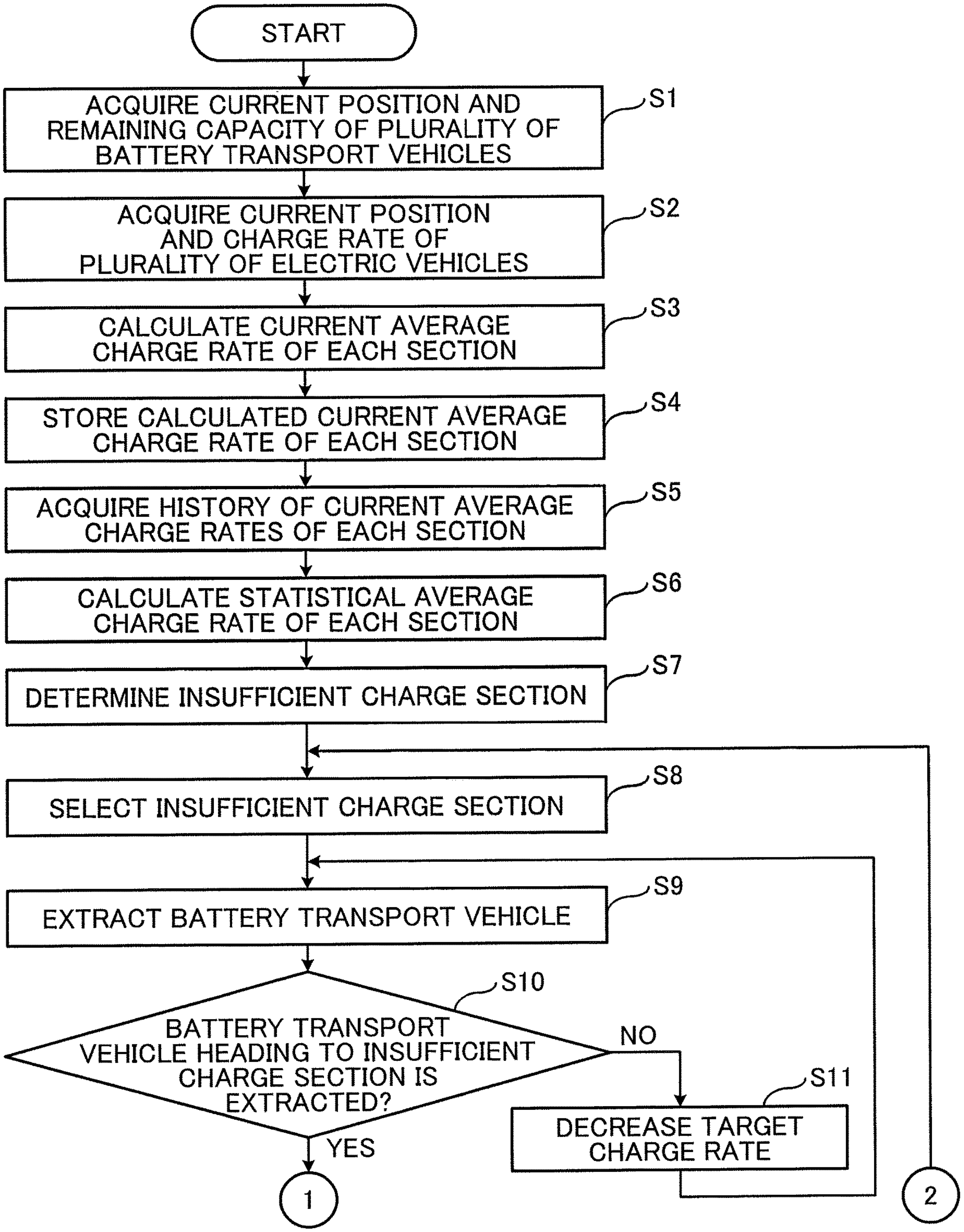
FIG. 4 is a first flowchart for describing battery transport processing of the server in the first embodiment of the present disclosure.
Figure 5:
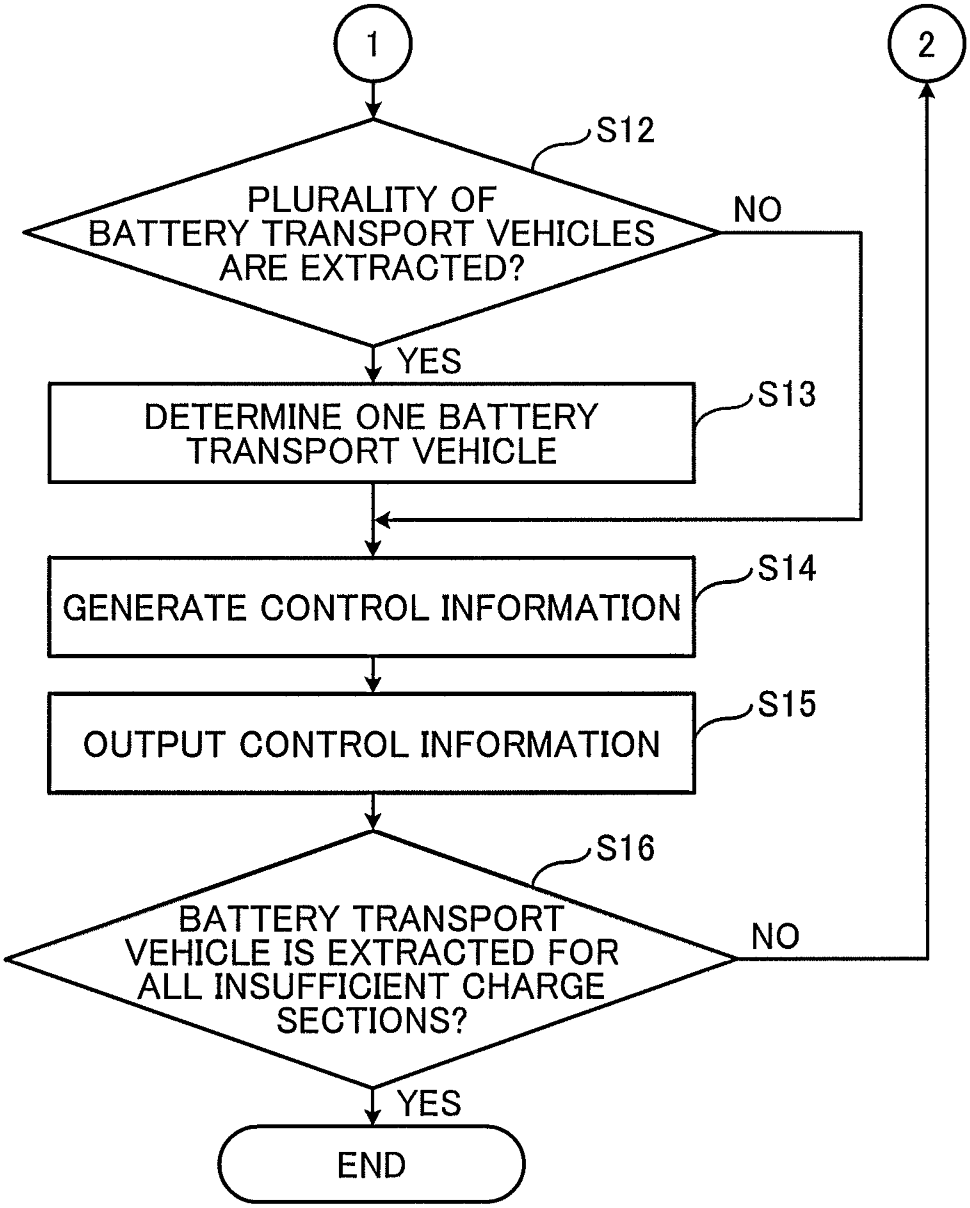
FIG. 5 is a second flowchart for describing the battery transport processing of the server in the first embodiment of the present disclosure.

FIG. 4 is a first flowchart for describing the battery transport processing of the server 2 in the first embodiment of the present disclosure, and FIG. 5 is a second flowchart for describing the battery transport processing of the server 2 in the first embodiment of the present disclosure.

First, in step S1, the first battery information acquisition part 201 acquires a current position of each of a plurality of the battery transport vehicles 1 and remaining capacity of the first battery from the battery transport vehicle DB storage part 222.

Next, in step S2, the second battery information acquisition part 202 acquires a current position of each of a plurality of the electric vehicles 3 and a charge rate of the second battery included in each of a plurality of the electric vehicles 3 from the electric vehicle DB storage part 223.

Next, in step S3, the current average charge rate calculation part 203 calculates a current average charge rate indicating an average of current charge rates of each section based on current positions and charge rates of a plurality of the electric vehicles 3.

Next, in step S4, the current average charge rate calculation part 203 stores the calculated current average charge rate of each section in the current average charge rate storage part 224.

Next, in step S5, the statistical average charge rate calculation part 204 acquires a history of current average charge rates of each section from the current average charge rate storage part 224. The statistical average charge rate calculation part 204 acquires a history of current average charge rates for past predetermined time including the same time as a current time from the current average charge rate storage part 224. For example, in a case where a current time is 12:30, the statistical average charge rate calculation part 204 acquires a history of current average charge rates for one hour from 12:00 to 13:00 on the previous day from the current average charge rate storage part 224.

Next, in step S6, the statistical average charge rate calculation part 204 calculates a statistical average charge rate indicating an average of charge rates per unit time of each section based on the acquired history of current average charge rates. Note that the statistical average charge rate calculation part 204 calculates a statistical average charge rate indicating an average of charge rates in predetermined past time including the same time as a current time. For example, in a case where a current time is 12:30, the statistical average charge rate calculation part 204 calculates an average of current average charge rates for one hour from 12:00 to 13:00 on the previous day as a statistical average charge rate. The statistical average charge rate calculation part 204 calculates a statistical average charge rate of each section.

Next, in step S7, the insufficient charge section determination part 205 determines an insufficient charge section in which a current average charge rate is lower than a target charge rate among a plurality of sections. The target charge rate is a statistical average charge rate. The insufficient charge section determination part 205 determines a section in which a value obtained by subtracting a current average charge rate from a statistical average charge rate is larger than a threshold among a plurality of sections as an insufficient charge section. The threshold is, for example, 10%.

Next, in step S8, the insufficient charge section determination part 205 selects an insufficient charge section in which the battery transport vehicle 1 is to be arranged. In a case where a plurality of insufficient charge sections are determined, the insufficient charge section determination part 205 selects one insufficient charge section from a plurality of insufficient charge sections.

Next, in step S9, the battery transport vehicle extraction part 206 extracts a battery transport vehicle heading to the insufficient charge section from among a plurality of battery transport vehicles. At this time, the battery transport vehicle extraction part 206 extracts, from a plurality of battery transport vehicles, a battery transport vehicle where a total power amount of a power amount necessary for the battery transport vehicle to move from a current position to the insufficient charge section, a power amount necessary for the battery transport vehicle to move from the insufficient charge section to a charging place for charging the first battery, and a power amount necessary for a current average charge rate to reach the target charge rate is equal to or less than remaining capacity.

Next, in step S10, the battery transport vehicle extraction part 206 determines whether or not a battery transport vehicle heading to the insufficient charge section is extracted.

Here, in a case where a battery transport vehicle heading to the insufficient charge section is determined not to be extracted (NO in step S10), the battery transport vehicle extraction part 206 decreases the current target charge rate in step S11. For example, the battery transport vehicle extraction part 206 decreases the current target charge rate by 10%. Then, the processing returns to step S9, and the battery transport vehicle extraction part 206 extracts a battery transport vehicle heading to the insufficient charge section from a plurality of battery transport vehicles again by using the decreased target charge rate. That is, the battery transport vehicle extraction part 206 extracts, from a plurality of battery transport vehicles, a battery transport vehicle where a total power amount of a power amount necessary for the battery transport vehicle to move from a current position to the insufficient charge section, a power amount necessary for the battery transport vehicle to move from the insufficient charge section to a charging place for charging the first battery, and a power amount necessary for a current average charge rate to reach the decreased target charge rate is equal to or less than remaining capacity.

Note that, in a case where a battery transport vehicle heading to the insufficient charge section is not extracted even after the target charge rate is decreased, the battery transport vehicle extraction part 206 further decreases the current target charge rate. For example, the battery transport vehicle extraction part 206 further decreases the current target charge rate by 10%. Then, the processing of steps S9 to S11 is repeatedly performed, and in a case where a battery transport vehicle heading to the insufficient charge section is not extracted even after the target charge rate is decreased by a predetermined value, the battery transport processing may end. For example, in a case where a battery transport vehicle heading to the insufficient charge section is not extracted even after the target charge rate is decreased by 30% from the initial rate, the battery transport processing may end.

On the other hand, in a case where a battery transport vehicle heading to the insufficient charge section is determined to be extracted (YES in step S10), in step S12, the battery transport vehicle extraction part 206 determines whether or not a plurality of battery transport vehicles heading to the insufficient charge section are extracted. Here, in a case where a plurality of battery transport vehicles heading to the insufficient charge section are determined not to be extracted, that is, in a case where one battery transport vehicle heading to the insufficient charge section is determined to be extracted (NO in step S12), the processing proceeds to step S14.

On the other hand, in a case where a plurality of battery transport vehicles heading to the insufficient charge section are determined to be extracted (YES in step S12), in step S13, the battery transport vehicle extraction part 206 determines one battery transport vehicle heading to the insufficient charge section. At this time, the battery transport vehicle extraction part 206 determines, as one battery transport vehicle heading to the insufficient charge section, one battery transport vehicle in which a total power amount of a power amount necessary for the battery transport vehicle to move from a current position to the insufficient charge section and a power amount necessary for the battery transport vehicle to move from the insufficient charge section to a charging place where the first battery is charged is smallest.

Next, in step S14, the control information generation part 207 generates control information for moving one of the battery transport vehicles 1 among a plurality of battery transport vehicles to the insufficient charge section selected by the insufficient charge section determination part 205. The control information generation part 207 calculates a moving route from a current position of the battery transport vehicle 1 extracted by the battery transport vehicle extraction part 206 to a charging spot in the insufficient charge section. Then, the control information generation part 207 generates control information for moving the battery transport vehicle 1 along the calculated moving route.

Next, in step S15, the output part 209 outputs the control information generated by the control information generation part 207. The communication part 21 transmits the control information output by the output part 209 to the battery transport vehicle 1 extracted by the battery transport vehicle extraction part 206. The battery transport vehicle 1 receives the control information transmitted by the server 2. Then, the battery transport vehicle 1 moves to the insufficient charge section according to the received control information.

Next, in step S16, the insufficient charge section determination part 205 determines whether or not a battery transport vehicle is extracted for all the insufficient charge sections determined by the insufficient charge section determination part 205. Here, in a case where a battery transport vehicle is determined not to be extracted for all the insufficient charge sections (NO in step S16), the processing returns to step S8, and the insufficient charge section determination part 205 selects another insufficient charge section in which the battery transport vehicle is to be arranged.

On the other hand, in a case where a battery transport vehicle is determined to be extracted for all the insufficient charge sections (YES in step S16), the battery transport processing ends.

As described above, a current average charge rate indicating an average of current charge rates of the second batteries included in a plurality of the electric vehicles 3 present in each of a plurality of sections on a map is calculated for each of a plurality of the sections, an insufficient charge section in which the calculated current average charge rate is lower than a target charge rate is determined among a plurality of the sections, and at least one of the battery transport vehicles 1 is arranged in the determined insufficient charge section. Therefore, electric power can be efficiently and stably supplied to the electric vehicle 3.

Note that, in the first embodiment, in a case where a current average charge rate reaches a target charge rate in an insufficient charge section, the control information generation part 207 may generate control information for moving the battery transport vehicle 1 from the insufficient charge section to a charging place for charging the first battery. Then, in a case where a current average charge rate reaches a target charge rate in an insufficient charge section, the output part 209 may generate control information for moving the battery transport vehicle 1 from the insufficient charge section to a charging place for charging the first battery.

Further, in the first embodiment, in a case where a current average charge rate reaches a target charge rate in an insufficient charge section, the insufficient charge section determination part 205 may determine again an insufficient charge section in which a current average charge rate is lower than a target charge rate among a plurality of sections. The control information generation part 207 may generate control information for causing the battery transport vehicle 1 present in an insufficient charge section to stand by in a case where an insufficient charge section that is determined again is present within a predetermined distance from a current position of the battery transport vehicle 1 present in an insufficient charge section, and a power amount necessary for a current average charge rate in the insufficient charge section determined again to reach a target charge rate is equal to or less than remaining capacity of the battery transport vehicle 1. The output part 209 may output control information for causing the battery transport vehicle 1 present in an insufficient charge section to stand by in a case where an insufficient charge section that is determined again is present within a predetermined distance from a current position of the battery transport vehicle 1 present in an insufficient charge section, and a power amount necessary for a current average charge rate in the insufficient charge section that is determined again to reach a target charge rate is equal to or less than remaining capacity of the battery transport vehicle 1.

Second Embodiment

In the first embodiment described above, in a case where at least one battery transport vehicle heading to an insufficient charge section is not extracted, the battery transport vehicle extraction part 206 decreases a target charge rate and extracts again at least one battery transport vehicle heading to the insufficient charge section from among a plurality of battery transport vehicles by using the decreased target charge rate. On the other hand, in a second embodiment, in a case where at least one battery transport vehicle heading to an insufficient charge section is not extracted, the battery transport vehicle extraction part extracts, from among a plurality of battery transport vehicles, a combination of two or more battery transport vehicles where the sum of remaining capacities of two or more battery transport vehicles among a plurality of battery transport vehicles is equal to or more than a power amount necessary for a current average charge rate to reach a target charge rate, as at least one battery transport vehicle heading to the insufficient charge section.

Figure 6:
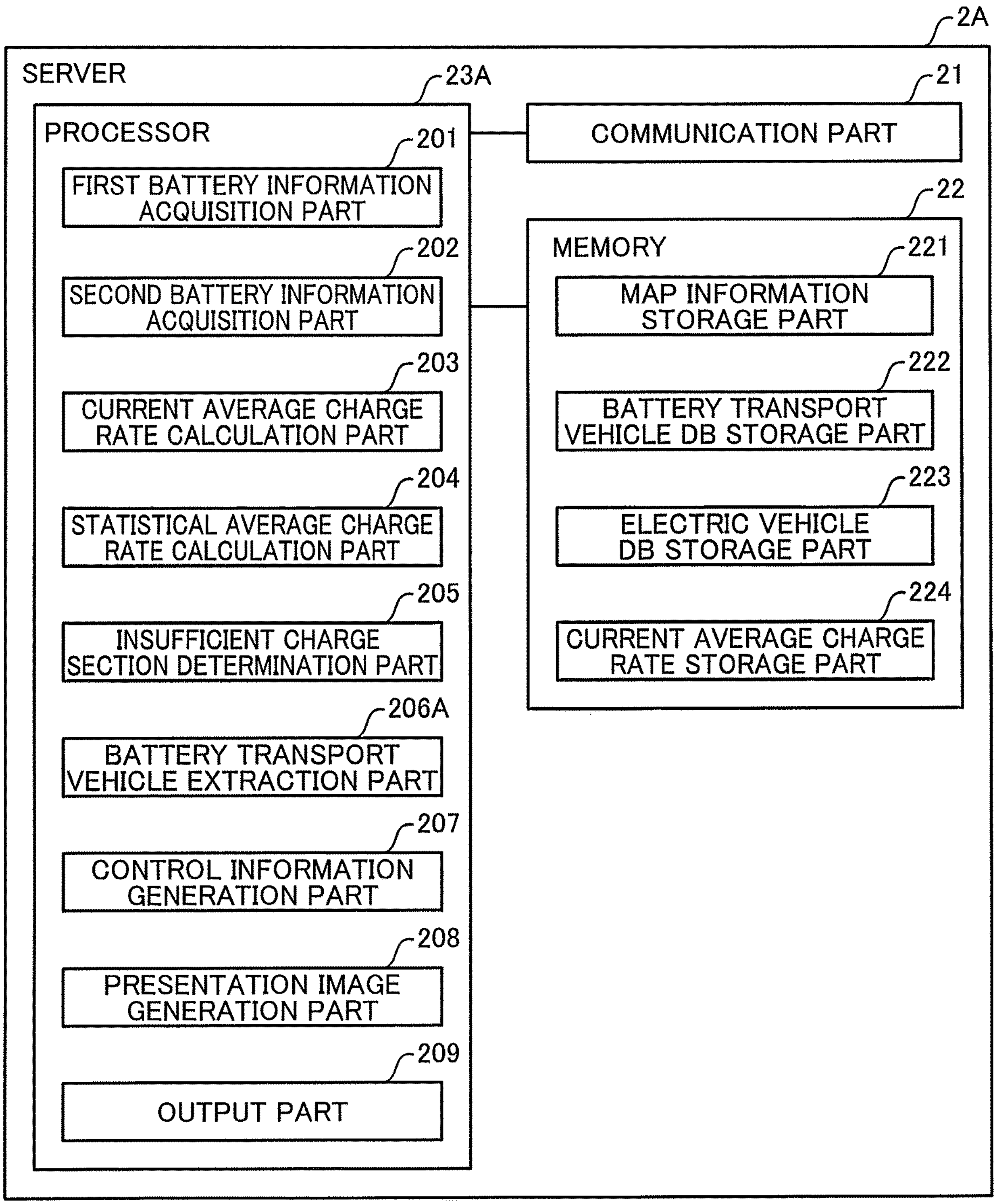
FIG. 6 is a block diagram illustrating an example of a configuration of the server according to a second embodiment of the present disclosure.

FIG. 6 is a block diagram illustrating an example of a configuration of a server 2A according to the second embodiment of the present disclosure. A configuration of the battery transport system is the same as that of the first embodiment.

The server 2A illustrated in FIG. 6 includes the communication part 21, the memory 22, and a processor 23A. Note that in the present second embodiment, the same configuration as that in the first embodiment will be denoted with the same reference sign, and omitted from description.

The processor 23A realizes the first battery information acquisition part 201, the second battery information acquisition part 202, the current average charge rate calculation part 203, the statistical average charge rate calculation part 204, the insufficient charge section determination part 205, a battery transport vehicle extraction part 206A, the control information generation part 207, the presentation image generation part 208, and the output part 209.

The battery transport vehicle extraction part 206A has the same function as the battery transport vehicle extraction part 206 of the first embodiment. Furthermore, in a case where at least one battery transport vehicle heading to an insufficient charge section is not extracted, the battery transport vehicle extraction part 206A extracts, from among a plurality of battery transport vehicles, a combination of two or more battery transport vehicles where the sum of remaining capacities of two or more battery transport vehicles among a plurality of battery transport vehicles is equal to or more than a power amount necessary for a current average charge rate to reach a target charge rate, as at least one battery transport vehicle heading to the insufficient charge section.

For example, in a case where a power amount necessary for a current average charge rate to reach a target charge rate is 30 Ah, there are three battery transport vehicles in a standby state, and remaining capacities of the three battery transport vehicles in a standby state are 5 Ah, 10 Ah, and 20 Ah, a combination of two battery transport vehicles with remaining capacities of 10 Ah and 20 Ah is extracted.

As described above, the battery transport vehicle extraction part 206A extracts a combination of two or more battery transport vehicles in which the sum of remaining capacities of two or more of the first batteries satisfies an extraction condition from among a plurality of battery transport vehicles as at least one battery transport vehicle heading to an insufficient charge section. That is, the battery transport vehicle extraction part 206A extracts a combination of two or more battery transport vehicles satisfying an extraction condition that the sum of remaining capacities of two or more of the first batteries is equal to or more than a power amount necessary for a current average charge rate to reach a target charge rate. Alternatively, the battery transport vehicle extraction part 206A extracts a combination of two or more battery transport vehicles that satisfies an extraction condition that remaining capacity of two or more of the first batteries is equal to or more than a total power amount of a total power amount necessary for two or more battery transport vehicles to move from a current position to an insufficient charge section, a total power amount necessary for the two or more battery transport vehicles to move from the insufficient charge section to a charging place where the two or more battery transport vehicles charge the first battery, and a power amount necessary for a current average charge rate to reach a target charge rate.

Note that an upper limit number of the number of battery transport vehicles to be combined may be determined in advance. For example, the battery transport vehicle extraction part 206A may permit a combination of three battery transport vehicles and may not extract a combination of four or more battery transport vehicles.

Note that, in a case where a plurality of combinations are extracted, the battery transport vehicle extraction part 206A determines, as at least one battery transport vehicle heading to an insufficient charge section, a combination of two or more battery transport vehicles where an average of total power amounts of a total power amount necessary for two or more battery transport vehicles to move from a current position to the insufficient charge section and a total power amount necessary for the two or more battery transport vehicles to move from the insufficient charge section to a charging place for charging the first battery is equal to or less than a predetermined power amount.

Further, in a case where a plurality of combinations are extracted, the battery transport vehicle extraction part 206A may determine, as at least one battery transport vehicle heading to an insufficient charge section, a combination of two or more battery transport vehicles where an average of total power amounts of a total power amount necessary for two or more battery transport vehicles to move from a current position to the insufficient charge section and a total power amount necessary for the two or more battery transport vehicles to move from the insufficient charge section to a charging place where the first battery is charged is smallest.

Furthermore, in a case where a plurality of combinations are extracted, the battery transport vehicle extraction part 206A may determine, as at least one battery transport vehicle heading to an insufficient charge section, a combination of two or more battery transport vehicles having a minimum power amount obtained by subtracting, from the sum of remaining capacities of the two or more battery transport vehicles, an average of total power amounts of a power amount necessary for the two or more battery transport vehicles to move from a current position to the insufficient charge section, a total power amount necessary for the two or more battery transport vehicles to move from the insufficient charge section to a charging place for charging the first battery and a power amount necessary for a current average charge rate to reach a target charge rate.

Next, battery transport processing of the server 2A in the second embodiment of the present disclosure will be described.

Figure 7:
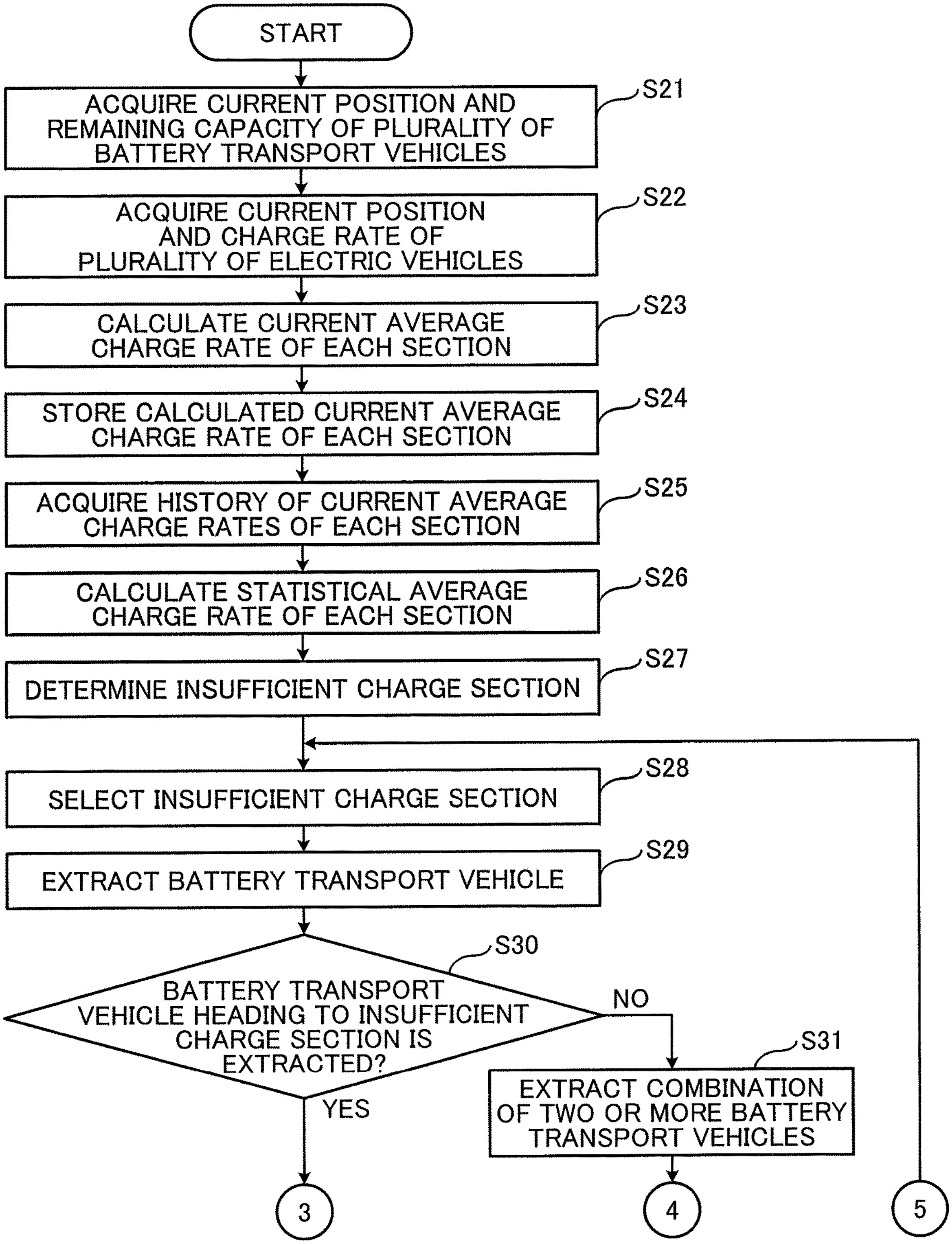
FIG. 7 is a first flowchart for describing the battery transport processing of the server in the second embodiment of the present disclosure.
Figure 8:
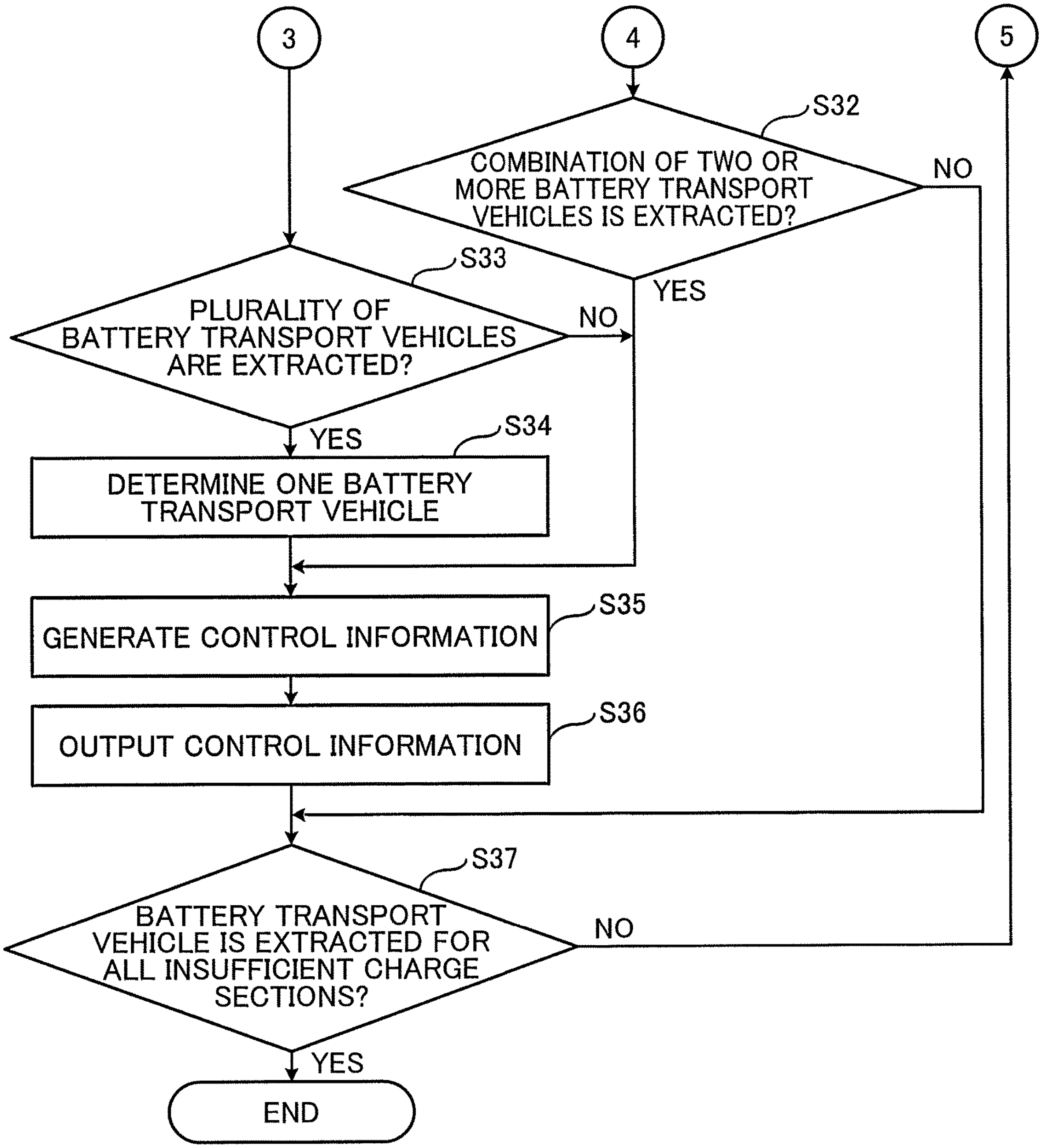
FIG. 8 is a second flowchart for describing the battery transport processing of the server in the second embodiment of the present disclosure.

FIG. 7 is a first flowchart for describing the battery transport processing of the server 2A in the second embodiment of the present disclosure, and FIG. 8 is a second flowchart for describing the battery transport processing of the server 2A in the second embodiment of the present disclosure.

Processing in steps S21 to S29 is the same as the processing in steps S1 to S9 illustrated in FIG. 4, and will be omitted from description.

Next, in step S30, the battery transport vehicle extraction part 206A determines whether or not a battery transport vehicle heading to the insufficient charge section is extracted.

Here, in a case where a battery transport vehicle heading to an insufficient charge section is determined not to be extracted (NO in step S30), in step S31, the battery transport vehicle extraction part 206A extracts, from among a plurality of battery transport vehicles, a combination of two or more battery transport vehicles where the sum of remaining capacities of two or more battery transport vehicles among a plurality of battery transport vehicles is equal to or more than a power amount necessary for a current average charge rate to reach a target charge rate, as at least one battery transport vehicle heading to the insufficient charge section.

Next, in step S32, the battery transport vehicle extraction part 206A determines whether or not a combination of two or more battery transport vehicles is extracted. Here, in a case where a combination of two or more battery transport vehicles is determined to be extracted (YES in step S32), the processing proceeds to step S35. Note that in a case where a plurality of combinations are extracted, the battery transport vehicle extraction part 206A may determine one combination from a plurality of the combinations by performing the processing described above.

On the other hand, in a case where a combination of two or more battery transport vehicles is determined not to be extracted (NO in step S32), the processing proceeds to step S37.

Further, in a case where a battery transport vehicle heading to the insufficient charge section is determined to be extracted (YES in step S30), in step S33, the battery transport vehicle extraction part 206A determines whether or not a plurality of battery transport vehicles heading to the insufficient charge section are extracted.

Note that the processing of steps S33 and S34 is the same as the processing of steps S12 and S13 illustrated in FIG. 5, and will be omitted from description.

Next, in step S35, the control information generation part 207 generates control information for moving one of the battery transport vehicles 1 among a plurality of battery transport vehicles to the insufficient charge section selected by the insufficient charge section determination part 205. Note that in a case where a combination of two or more battery transport vehicles is extracted by the battery transport vehicle extraction part 206A, the control information generation part 207 generates control information for moving a combination of two or more battery transport vehicles among a plurality of battery transport vehicles to the insufficient charge section.

Next, in step S36, the output part 209 outputs the control information generated by the control information generation part 207. The communication part 21 transmits the control information output by the output part 209 to one of the battery transport vehicles 1 or a combination of two or more of the battery transport vehicles 1 extracted by the battery transport vehicle extraction part 206A. The battery transport vehicle 1 receives the control information transmitted by the server 2. Then, one of the battery transport vehicles 1 or a combination of two or more of the battery transport vehicles 1 move to the insufficient charge section according to the received control information.

Note that the processing in step S37 is the same as the processing in step S16 shown in FIG. 5, and will be omitted from description.

Next, a driver presentation image presented to a driver of the electric vehicle 3 in the first and second embodiments will be described.

Figure 9:
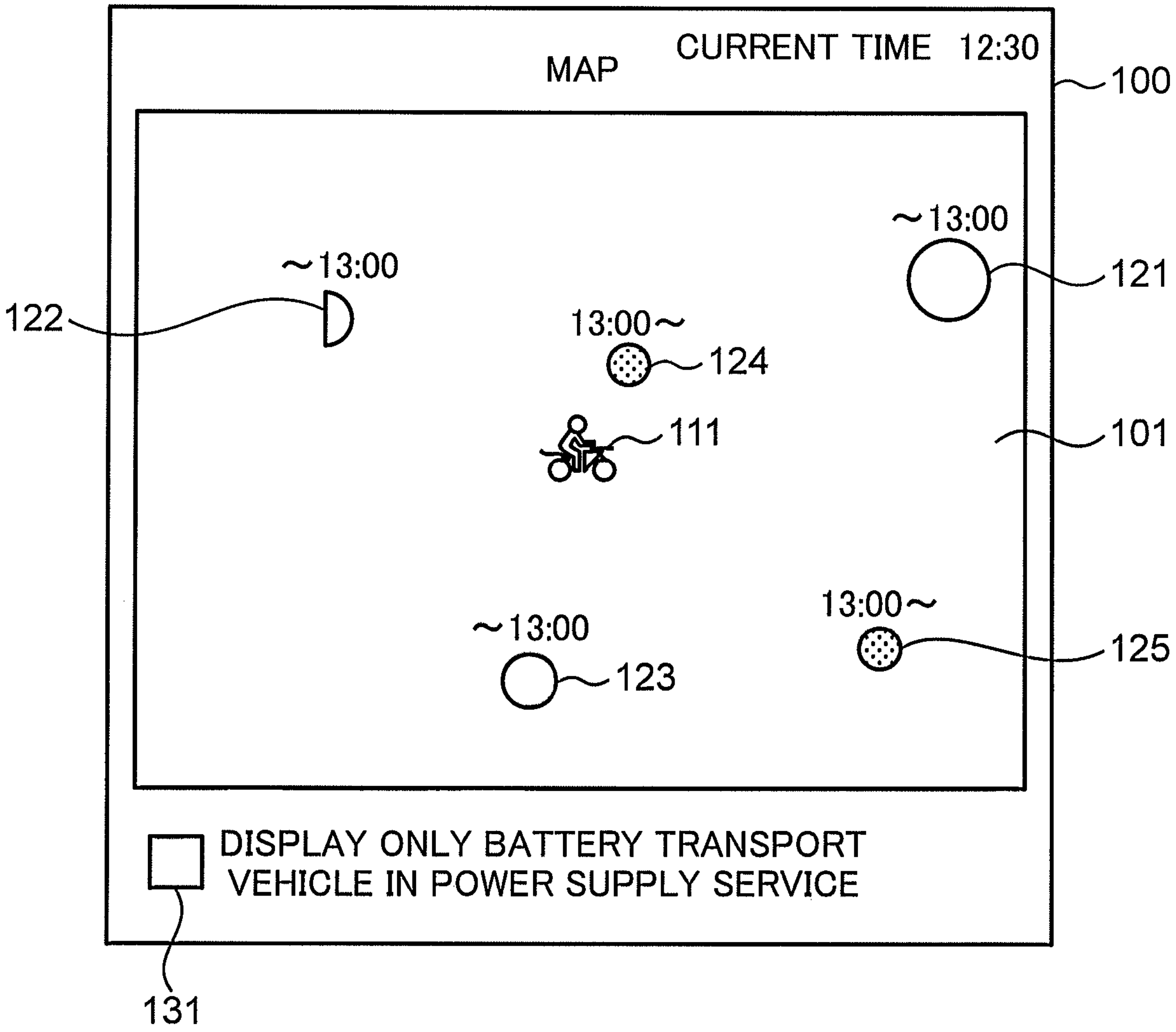
FIG. 9 is a diagram illustrating an example of a driver presentation image presented to a driver of an electric vehicle in the first and second embodiments.

FIG. 9 is a diagram illustrating an example of a driver presentation image presented to a driver of the electric vehicle 3 in the first and second embodiments.

An information terminal displays a driver presentation image 100 illustrated in FIG. 9. The driver presentation image 100 includes a map 101, an electric vehicle icon (first icon) 111 indicating a current position of the electric vehicle 3 on the map, and battery transport vehicle icons (second icons) 121 to 125 indicating a current position on the map of the battery transport vehicle 1 present in an insufficient charge section. The electric vehicle icon 111 is displayed at the center on the map 101, and the battery transport vehicle icons 121 to 125 are displayed at a position of a charging spot in an insufficient charge section on the map 101. The battery transport vehicle icons 121 to 125 indicate a position of a battery transport vehicle that is currently performing a power supply service or a position of a battery transport vehicle that is to perform a power supply service in the future.

Further, a time zone in which the battery transport vehicle 1 performs a power supply service is displayed above the battery transport vehicle icons 121 to 125. For example, an end time of a power supply service by the battery transport vehicle 1 is displayed above the battery transport vehicle icons 121 to 123, and FIG. 9 indicates that the power supply service is performed until 13:00. A time zone in which the battery transport vehicle 1 performs a power supply service represents time when a history of past current average charge rates used when a statistical average charge rate is calculated is acquired. For example, in a case where a history of current average charge rates from 12:00 to 13:00 on the previous day is used when a statistical average charge rate is calculated, a time zone in which the battery transport vehicle 1 performs a power supply service is from 12:00 to 13:00.

Further, for example, a start time of a power supply service by the battery transport vehicle 1 is displayed above the battery transport vehicle icons 124 to 125, and FIG. 9 indicates that the power supply service is performed from 13:00. A time zone in which the battery transport vehicle 1 performs a power supply service represents time when a history of past current average charge rates used when a statistical average charge rate is calculated is acquired. For example, in a case where a history of current average charge rates from 13:00 to 14:00 on the previous day is used when a statistical average charge rate is calculated, a time zone in which the battery transport vehicle 1 performs a power supply service is from 13:00 to 14:00.

The battery transport vehicle icons 124 to 125 represent a future arrangement position of the battery transport vehicle 1. The battery transport vehicle icons 121 to 123 where the battery transport vehicle 1 currently performs a power supply service and the battery transport vehicle icon 124 to 125 where the battery transport vehicle 1 performs a power supply service in the future are displayed in different modes. For example, a color, pattern, or shape of the battery transport vehicle icons 121 to 123 may be different from a color, pattern, or shape of the battery transport vehicle icons 124 to 125.

Further, in a case where a battery transport vehicle icon where the battery transport vehicle 1 currently performs a power supply service and a battery transport vehicle icon where the battery transport vehicle 1 performs a power supply service in the future are present at the same position, the battery transport vehicle icon where the battery transport vehicle 1 currently performs the power supply service may be preferentially displayed.

Further, size of the battery transport vehicle icons 121 to 125 may be changed according to maximum charge capacity of the first battery included in the battery transport vehicle 1. For example, the battery transport vehicle icons 121 to 125 are displayed larger as maximum charge capacity is larger.

Further, a shape of the battery transport vehicle icons 121 to 125 may be changed according to a level of remaining capacity of the first battery included in the battery transport vehicle 1. For example, the battery transport vehicle icons 121 to 125 are displayed smaller as remaining capacity is less. For example, since remaining capacity of the first battery included in the battery transport vehicle 1 is 50% of maximum charge capacity, the battery transport vehicle icon 122 is displayed in a semicircular shape in which the left side is missing.

Further, density of the battery transport vehicle icons 121 to 125 may be changed according to a level of remaining capacity of the first battery included in the battery transport vehicle 1. For example, density of the battery transport vehicle icons 121 to 125 are displayed to be lower as remaining capacity is less.

Further, in the first and second embodiments, the driver presentation image 100 may include a check box 131 that receives input by a driver as to whether or not to display only a battery transport vehicle in a power supply service.

Figure 10:
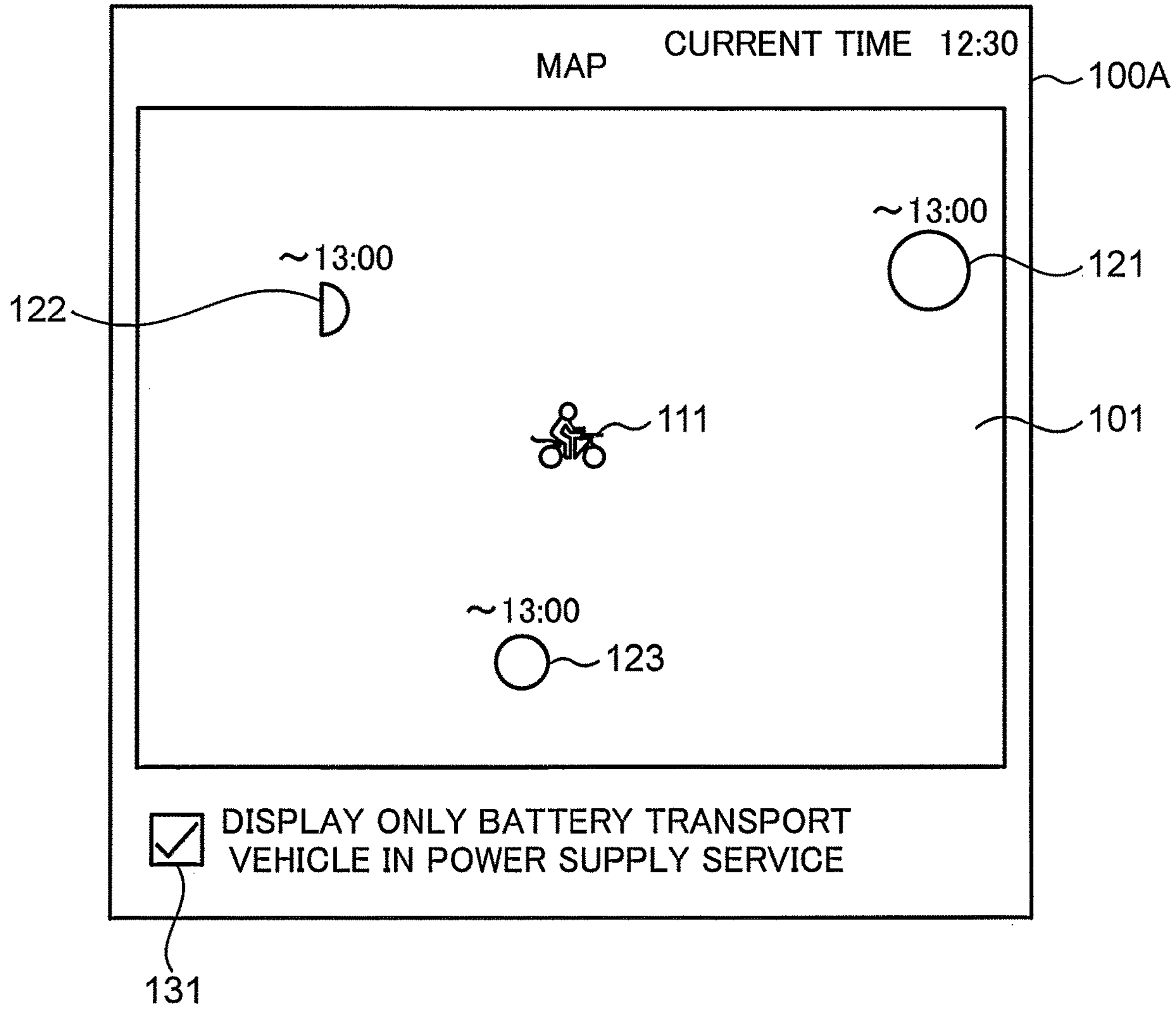
FIG. 10 is a diagram illustrating an example of a driver presentation image presented to a driver of an electric vehicle in a case where only a battery transport vehicle in a power supply service is displayed in the first and second embodiments.

FIG. 10 is a diagram illustrating an example of a driver presentation image presented to a driver of the electric vehicle 3 in a case where only a battery transport vehicle in a power supply service is displayed in the first and second embodiments.

When the check box 131 included in the driver presentation image 100 illustrated in FIG. 9 is selected by a driver, a driver presentation image 100A illustrated in FIG. 10 is displayed. The driver presentation image 100A includes the map 101, the electric vehicle icon (first icon) 111 indicating a current position of the electric vehicle 3 on the map, and the battery transport vehicle icons (second icons) 121 to 123 indicating a current position on the map of the battery transport vehicle 1 present in an insufficient charge section.

When the check box 131 for receiving input as to whether or not to display only a battery transport vehicle that is currently in service is selected by a driver, only the battery transport vehicle icons 121 to 123 where the battery transport vehicle 1 is currently performing a power supply service is displayed.

Further, in a variation of the first and second embodiments, a driver may designate a time, and a battery transport vehicle icon corresponding to the designated time may be displayed.

Figure 11:
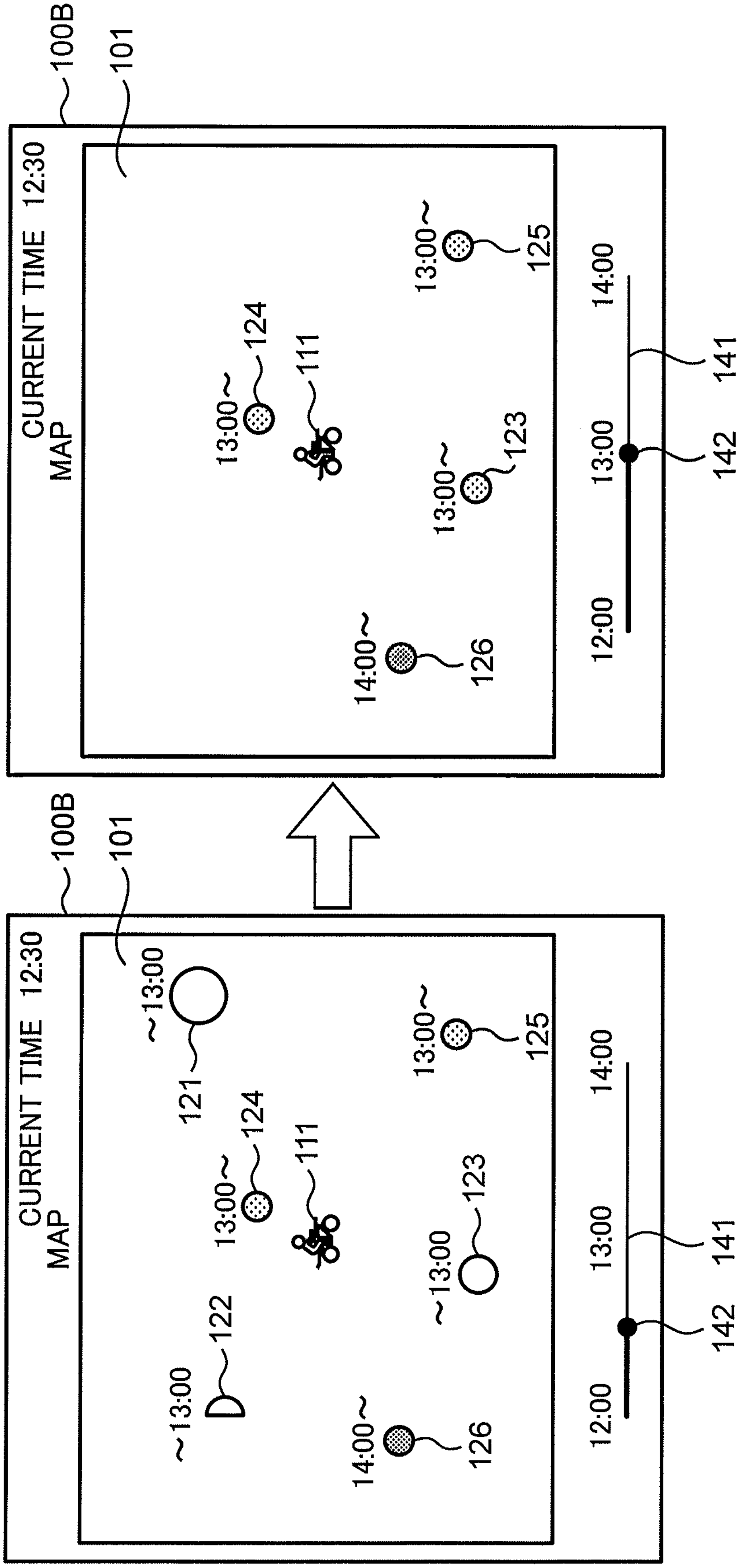
FIG. 11 is a diagram illustrating an example of a driver presentation image presented to a driver of an electric vehicle in a variation of the first and second embodiments.

FIG. 11 is a diagram illustrating an example of a driver presentation image presented to a driver of the electric vehicle 3 in a variation of the first and second embodiments.

The driver presentation image 100B includes the map 101, the electric vehicle icon (first icon) 111 indicating a current position of the electric vehicle 3 on the map, the battery transport vehicle icons (second icons) 121 to 126 indicating a current position on the map of the battery transport vehicle 1 present in an insufficient charge section, and a time slide bar 141.

The time slide bar 141 receives designation of a time by a driver. A driver can advance a displayed time by moving a point 142 on the time slide bar 141 in the right direction.

The driver presentation image 100B on the left side of FIG. 11 includes the battery transport vehicle icons 121 to 126 from a current time (12:30) to after predetermined time. The battery transport vehicle icons 121 to 123 indicate a position of a battery transport vehicle that is performing a power supply service in a first time zone (12:00 to 13:00) including a current time. Further, the battery transport vehicle icons 124 to 125 indicate a position of a battery transport vehicle that performs a power supply service in a second time zone (13:00 to 14:00) next to the first time zone. Further, the battery transport vehicle icon 126 indicates a position of a battery transport vehicle that performs a power supply service in a third time zone (14:00 to 15:00) next to the second time zone.

Note that, in a case where an insufficient charge section in the second time zone and the third time zone in the future are determined, the insufficient charge section determination part 205 may predict an average charge rate in the second time zone and the third time zone in the future and determine an insufficient charge section in which the predicted average charge rate is lower than a statistical average charge rate. In this case, the insufficient charge section determination part 205 may input a plurality of current average charge rates per unit time in the past to a prediction model, and acquire a predicted value of an average charge rate in the second time zone and the third time zone in the future from the prediction model. The prediction model may be generated in advance by machine learning with a current average charge rate at a predetermined time as an input value and a current average charge rate after predetermined time as an output value.

The driver presentation image 100B on the right side of FIG. 11 includes the battery transport vehicle icons 124 to 126 from a time (13:00) designated by a driver on the time slide bar 141 to after predetermined time. The battery transport vehicle icons 124 to 125 indicate a position of a battery transport vehicle that performs a power supply service in the second time zone (13:00 to 14:00) next to the first time zone (12:00 to 13:00) including a current time. Further, the battery transport vehicle icon 126 indicates a position of a battery transport vehicle that performs a power supply service in a third time zone (14:00 to 15:00) next to the second time zone.

In this way, a driver can check a position of a battery transport vehicle that performs a power supply service at an optional time.

Further, in the first and second embodiments, the presentation image generation part 208 generates a driver presentation image for presenting a map, an electric vehicle icon indicating a current position on the map of the electric vehicle 3, and a battery transport vehicle icon indicating a current position on the map of the battery transport vehicle 1 present in an insufficient charge section to the driver of the electric vehicle 3, but the present disclosure is not particularly limited to this. The presentation image generation part 208 may generate an administrator presentation image (presentation image) including a map, a charging base icon (first icon) indicating a position on the map of a charging base, and a battery transport vehicle icon (second icon) indicating a current position on the map of the battery transport vehicle 1 present in an insufficient charge section. The administrator presentation image is generated for presentation to an administrator of a plurality of the battery transport vehicles 1.

Further, the output part 209 outputs an administrator presentation image (presentation image) generated by the presentation image generation part 208 to the communication part 21. The communication part 21 transmits the administrator presentation image output by the output part 209 to the information terminal. An information terminal may be a personal computer, a smartphone, or a tablet computer used by an administrator. The information terminal receives input from an administrator and requests the server 2 for an administrator presentation image. The server 2 generates an administrator presentation image according to the request, and transmits the generated administrator presentation image to the information terminal. The information terminal receives the administrator presentation image transmitted by the server 2 and displays the received administrator presentation image.

Figure 12:
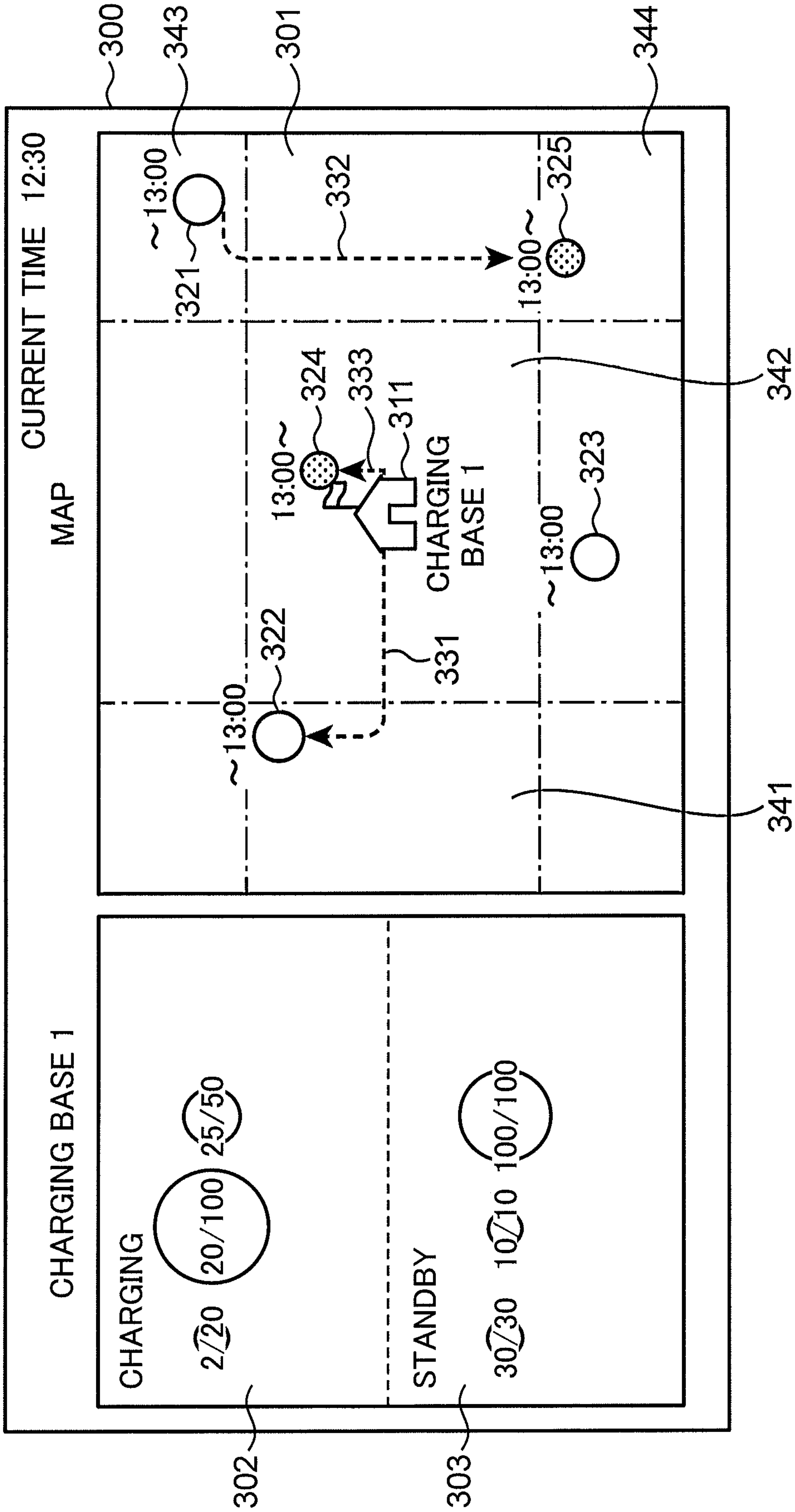
FIG. 12 is a diagram illustrating an example of an administrator presentation image presented to an administrator of a plurality of battery transport vehicles in the first and second embodiments.

FIG. 12 is a diagram illustrating an example of an administrator presentation image presented to an administrator of a plurality of the battery transport vehicles 1 in the first and second embodiments.

The information terminal displays an administrator presentation image 300 illustrated in FIG. 12. The administrator presentation image 300 includes a map 301, a charging base icon 311 indicating a position on the map of a charging base, and battery transport vehicle icons 321 to 325 indicating a current position on the map of the battery transport vehicle 1 present in an insufficient charge section. The charging base icon 311 is displayed at the center on the map 301, and the battery transport vehicle icons 321 to 325 is displayed at a position of a charging spot in an insufficient charge section on the map 301. The battery transport vehicle icons 321 to 325 indicate a position of a battery transport vehicle that is currently performing a power supply service or a position of a battery transport vehicle that is to perform a power supply service in the future.

Further, the administrator presentation image 300 further includes a first region 302 for presenting information regarding a battery transport vehicle being charged in a charging base and a second region 303 for presenting information regarding a battery transport vehicle being on standby in a charging base. The first region 302 includes a battery transport vehicle icon indicating a battery transport vehicle that is being charged in a charging base. The second region 303 includes a battery transport vehicle icon indicating a battery transport vehicle being on standby in a charging base. Numerical values shown on a battery transport vehicle icon in the first region 302 and the second region 303 represent remaining capacity/maximum charge capacity.

Note that a method of displaying the battery transport vehicle icons 321 to 325 is the same as the method of displaying the battery transport vehicle icons 121 to 125 in the driver presentation image 100 of FIG. 9.

Further, although one of the charging base icon 311 is displayed in the administrator presentation image 300 illustrated in FIG. 12, a plurality of the charging base icons 311 may be displayed. The administrator presentation image 300 may include not only one of the charging base icon 311 but also a plurality of the charging base icons 311.

Further, the administrator presentation image 300 may further include scheduled moving lines 331, 332, and 333 that connect a current position of the battery transport vehicle 1 and an insufficient charge section as a moving destination. The scheduled moving line 331 indicates that the battery transport vehicle 1 present in a charging base moves to a charging spot in a section 341. The scheduled moving line 333 indicates that the battery transport vehicle 1 present in a charging base moves to a charging spot in a section 342. Further, the scheduled moving line 332 indicates that the battery transport vehicle 1 that supplies power at a charging spot of a section 343 moves to a charging spot in a section 344.

Further, the administrator presentation image 300 may include a current average charge rate and a statistical average charge rate of each section displayed in the map 301. A current average charge rate and a statistical average charge rate of each section displayed in the map 301 may be displayed for each section. In the administrator presentation image 300, the sum of maximum charge capacities of a plurality of electric vehicles present in each section displayed in the map 301 and an average per unit time of the sums of maximum charge capacities of a plurality of electric vehicles in each section may be displayed for each section. Note that the sum of maximum charge capacities of a plurality of electric vehicles in each section may be stored in the memory 22 as history information. The presentation image generation part 208 may acquire a history of the sums of maximum charge capacities of a plurality of electric vehicles in each section in a past predetermined time zone including the same time as a current time from the memory 22, and calculate an average of the sums of maximum charge capacities of a plurality of electric vehicles in each section.

Note that in each of the above embodiments, each constituent element may include dedicated hardware or may be implemented by execution of a software program suitable for each constituent element. Each constituent element may be realized by a program execution unit, such as a CPU or a processor, reading and executing a software program recorded in a recording medium such as a hard disk or a semiconductor memory. Further, a program may be executed by another independent computer system by being recorded in a recording medium for transfer or by being transferred via a network.

Some or all functions of the device according to the embodiment of the present disclosure are implemented as large scale integration (LSI), which is typically an integrated circuit. These functions may be individually integrated into one chip, or may be integrated into one chip so as to include some or all functions. Further, circuit integration is not limited to LSI, and may be implemented by a dedicated circuit or a general-purpose processor. A field programmable gate array (FPGA), which can be programmed after manufacturing of LSI, or a reconfigurable processor in which connection and setting of circuit cells inside LSI can be reconfigured may be used.

Some or all functions of the device according to the embodiment of the present disclosure may be implemented by a processor such as a CPU executing a program.

Further, the numerical figures used above are all illustrated to specifically describe the present disclosure, and the present disclosure is not limited to the illustrated numerical figures.

Further, the order in which each step shown in the above flowchart is executed is for specifically describing the present disclosure, and may be any order other than the above order as long as a similar effect is obtained. Further, some of the above steps may be executed simultaneously (in parallel) with other steps.

Since a technique according to the present disclosure can efficiently and stably supply electric power to an electric mobile body, the technique according to the present disclosure is useful as a technique for supplying electric power from a battery transport mobile body that transports a battery to an electric mobile body to charge a battery of the electric mobile body.

The invention claimed is:

1. An information processing method by a computer, the information processing method comprising:

acquiring a current position of each of a plurality of battery transport mobile bodies transporting a first battery;

acquiring a current position of each of a plurality of electric mobile bodies and a charge rate of a second battery included in each of the plurality of electric mobile bodies;

calculating a current charge rate for each of a plurality of sections on a map based on a charge rate of at least one second battery present in each of the plurality of sections;

determining an insufficient charge section having the current charge rate lower than a target charge rate among the plurality of sections; and outputting control information for moving at least one battery transport mobile body among the plurality of battery transport mobile bodies to the determined insufficient charge section; wherein determining the insufficient charge includes determining a section in which a value obtained by subtracting the current charge rate from the target charge rate is larger than a threshold among the plurality of sections as the insufficient charge section.

2. The information processing method according to claim 1, wherein the current charge rate includes a current average charge rate indicating an average of current charge rates of the second batteries of the at least one electric mobile body present in each of the plurality of sections, the information processing method further comprising:

acquiring a history of the current average charge rates calculated in past in each of the plurality of sections; and calculating, for each of the plurality of sections, a statistical average charge rate indicating an average of the charge rates per unit time in each of the plurality of sections based on the acquired history of the current average charge rates, wherein determining the insufficient charge includes using the calculated statistical average charge rate as the target charge rate in determination of the insufficient charge section.

3. The information processing method according to claim 1, further comprising:

acquiring remaining capacity of the first battery of each of the plurality of battery transport mobile bodies; and extracting, from among the plurality of battery transport mobile bodies, a battery transport mobile body where a power amount necessary for the current charge rate to reach the target charge rate is equal to or less than the remaining capacity as the at least one battery transport mobile body heading to the insufficient charge section.

4. The information processing method according to claim 1, further comprising:

acquiring remaining capacity of the first battery of each of the plurality of battery transport mobile bodies; and extracting, from among the plurality of battery transport mobile bodies, a battery transport mobile body where a total power amount of a power amount necessary for the battery transport mobile body to move from a current position to the insufficient charge section, a power amount necessary for the battery transport mobile body to move from the insufficient charge section to a charging place for charging the first battery, and a power amount necessary for the current charge rate to reach the target charge rate is equal to or less than the remaining capacity as the at least one battery transport mobile body heading to the insufficient charge section.

5. The information processing method according to claim 3, further comprising:

in a case where a plurality of battery transport mobile bodies heading to the insufficient charge section are extracted, determining, as the at least one battery transport mobile body heading to the insufficient charge section, a battery transport mobile body where a total power amount of a power amount necessary for the battery transport mobile body to move from a current position to the insufficient charge section and a power amount necessary for the battery transport mobile body to move from the insufficient charge section to a charging place for charging the first battery is equal to or less than a predetermined power amount.

6. The information processing method according to claim 3, further comprising:

in a case where a plurality of battery transport mobile bodies heading to the insufficient charge section are extracted, determining, as the at least one battery transport mobile body heading to the insufficient charge section, a battery transport mobile body having a minimum power amount obtained by subtracting, from the remaining capacity of the battery transport mobile body, a total power amount of a power amount necessary for the battery transport mobile body to move from a current position to the insufficient charge section, a power amount necessary for the battery transport mobile body to move from the insufficient charge section to a charging place for charging the first battery, and a power amount necessary for the current charge rate to reach the target charge rate.

7. The information processing method according to claim 3, further comprising decreasing the target charge rate in a case where the at least one battery transport mobile body heading to the insufficient charge section is not extracted, wherein extracting the battery transport mobile body includes extracting again the at least one battery transport mobile body heading to the insufficient charge section from the plurality of battery transport mobile bodies by using the decreased target charge rate.

8. The information processing method according to claim 3, further comprising:

in a case where the at least one battery transport mobile body heading to the insufficient charge section is not extracted, extracting, from the plurality of battery transport mobile bodies as the at least one battery transport mobile body heading to the insufficient charge section, a combination of two or more battery transport mobile bodies where a sum of the remaining capacities of the two or more battery transport mobile bodies among the plurality of battery transport mobile bodies is equal to or more than a power amount necessary for the current charge rate to reach the target charge rate.

9. The information processing method according to claim 1, further comprising:

in a case where the current charge rate reaches the target charge rate in the insufficient charge section, outputting control information for moving the battery transport mobile body from the insufficient charge section to a charging place for charging the first battery.

10. The information processing method according to claim 1, further comprising:

acquiring remaining capacity of the first battery of each of the plurality of battery transport mobile bodies;

in a case where the current charge rate reaches the target charge rate in the insufficient charge section, determining again an insufficient charge section in which the current charge rate is lower than the target charge rate among the plurality of sections; and in a case where the insufficient charge section determined again is present within a predetermined distance from a current position of the battery transport mobile body present in the insufficient charge section, and a power amount necessary for the current charge rate in the insufficient charge section determined again to reach the target charge rate is equal to or less than remaining capacity of the battery transport mobile body, outputting control information for causing the battery transport mobile body present in the insufficient charge section to stand by.

11. The information processing method according to claim 1, further comprising:

outputting a presentation image including a map, a first icon indicating a current position on the map of the electric mobile body, and a second icon indicating a current position on the map of the battery transport mobile body present in the insufficient charge section.

12. The information processing method according to claim 1, further comprising:

outputting a presentation image including a map, a first icon indicating a position on the map of a charging base for charging the first battery of the battery transport mobile body, and a second icon indicating a current position on the map of the battery transport mobile body present in the insufficient charge section.

13. An information processing device comprising:

a first acquisition part that acquires a current position of each of a plurality of battery transport mobile bodies transporting a first battery;

a second acquisition part that acquires a current position of each of a plurality of electric mobile bodies and a charge rate of a second battery included in each of the plurality of electric mobile bodies;

a calculation part that calculates a current charge rate for each of a plurality of sections on a map based on a charge rate of at least one second battery present in each of the plurality of sections;

a determination part that determines an insufficient charge section having the current charge rate lower than a target charge rate among the plurality of sections; and an output part that outputs control information for moving at least one battery transport mobile body among the plurality of battery transport mobile bodies to the determined insufficient charge section; wherein the determination part determines a section in which a value obtained by subtracting the current charge rate from the target charge rate is larger than a threshold among the plurality of sections as the insufficient charge section.

14. A non-transitory computer readable recording medium storing an information processing program that causes a computer to:

acquire a current position of each of a plurality of battery transport mobile bodies transporting a first battery;

acquire a current position of each of a plurality of electric mobile bodies and a charge rate of a second battery included in each of the plurality of electric mobile bodies;

calculate a current charge rate for each of a plurality of sections on a map based on a charge rate of at least one second battery present in each of the plurality of sections;

determine an insufficient charge section having the current charge rate lower than a target charge rate among the plurality of sections; and output control information for moving at least one battery transport mobile body among the plurality of battery transport mobile bodies to the determined insufficient charge section; wherein in the determination of the insufficient charge section, a section in which a value obtained by subtracting the current charge rate from the target charge rate is larger than a threshold among the plurality of sections is determined as the insufficient charge section.

* * * * *